(12) United States Patent
Sugiura et al.

(10) Patent No.: US 6,359,587 B1
(45) Date of Patent: Mar. 19, 2002

(54) WIRELESS COMMUNICATION SYSTEM AND METHOD AND SYSTEM FOR DETECTION OF POSITION OF RADIO MOBILE STATION

(75) Inventors: Masataka Sugiura, Tokyo; Hiroyoshi Ishibashi, Yokohama; Etsumi Kanaya, Yokohama; Toru Kubo, Yokohama; Kazuaki Yamaguchi, Yokohama; Natsuki Oka, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/678,324

(22) Filed: Oct. 3, 2000

Related U.S. Application Data

(62) Division of application No. 08/819,985, filed on Mar. 18, 1997, now Pat. No. 6,140,964.

(30) Foreign Application Priority Data

Mar. 22, 1996 (JP) .............................................. 8-91867
Jul. 24, 1996 (JP) ............................................ 8-212187
Jul. 29, 1996 (JP) ............................................ 8-198703

(51) Int. Cl.[7] .............................. G01S 3/02; H04Q 7/20
(52) U.S. Cl. ........................ 342/457; 342/451; 455/456
(58) Field of Search ................................ 342/457, 464, 342/451; 455/456; 340/573.1; 701/208

(56) References Cited

U.S. PATENT DOCUMENTS

| | | | |
|---|---|---|---|
| 4,232,317 A | 11/1980 | Freeny, Jr. | 342/464 |
| 5,293,642 A | 3/1994 | Lo | 455/456 |
| 5,394,158 A * | 2/1995 | Chia | 342/457 |
| 5,434,950 A | 7/1995 | Kaallman | 706/20 |
| 5,564,079 A * | 10/1996 | Olsson | 455/456 |
| 5,570,412 A | 10/1996 | LeBlanc | 455/456 |
| 5,572,221 A * | 11/1996 | Marlevi et al. | 342/452 |
| 5,657,487 A | 8/1997 | Doner | 455/456 |
| 5,717,406 A * | 2/1998 | Sanderford et al. | 342/457 |
| 6,127,975 A * | 10/2000 | Maloney | 342/457 |

FOREIGN PATENT DOCUMENTS

| | | |
|---|---|---|
| EP | 0631453 | 12/1994 |
| GB | 2280327 | 1/1995 |
| JP | 2044929 | 2/1990 |
| JP | 07-231473 | 8/1995 |

OTHER PUBLICATIONS

"A Design of Personal Handy–Phone Terminals" by Y. Nakamura et al. pp. 769–774, 1995.

"A study on mobile location detection based on field strength meansurement in a cellular system" by S. Ohashi et al. 1993 Electronic Information Communication Institute Autumn National Conference.

* cited by examiner

*Primary Examiner*—Gregory C. Issing
(74) *Attorney, Agent, or Firm*—Israel Gopstein

(57) ABSTRACT

A method of detecting a position of a radio mobile station in radiocommiunications, which is capable of accurately and simply finding the position of the mobile station. At a measuring point the mobile station measures the reception radio strength levels from a plurality of base stations and conveys the measurement results through the base station to a control station. The control station learns, through a neural network, the correlation between the reception radio strength levels and the position of the mobile station on the basis of the measurement results at a plurality of measuring points and the positions of the measuring points. Subsequently, when the mobile station communicates to the control station the reception radio strength levels measured at an arbitrary point, the control station estimates the position of the mobile station, causing those measurement results, on the basis of the correlation obtained through the learning.

7 Claims, 19 Drawing Sheets

WIRELESS COMMUNICATION SYSTEM AND METHOD AND SYSTEM FOR DETECTION OF POSITION OF RADIO MOBILE STATION

This application is a Division of application Ser. No. 08/819,985 filed Mar. 18, 1997, now U.S. Pat. No. 6,140, 964.

BACKGROUND OF THE INVENTION

1. Field of the Invention The present invention relates to a mobile station position detection method and a system for detecting a position of a person or object who or which carries a mobile station in wireless radiocommunications and a radiocommunication system based thereupon, which are capable of accomplishing the detection of the position of the mobile station with a high accuracy.

2. Description of the Prior Art

In wireless communication fields such as portable radio telephone systems and personal handy-phone systems (PHS), a radio wave strength (an electric field strength) level at reception varies in accordance with the distance from a base station. This signifies that the detection of the strength levels of radio waves picked up from a plurality of base stations in a mobile station side allows the detection of the position of the mobile station, i.e., the position of a person or object who or which carries the mobile station. However, in the case of radio communication systems such as prior portable telephones and PHSs where a plurality of radio zones constitute a service area, the specification of the present location of a mobile station is limited to within a relatively wide area being the range of a radio zone of a base station which accepted the position registration of the mobile station (the range of a general calling area composed of a plurality of radio zones including the radio zone of the base station which accepted the position registration).

For the accurate detection of the location of the mobile station, for example, in the "Mobile Station Position Detection Method" disclosed in Japanese Unexamined Patent Publication No. 2-44929, applying the fact that the radio zones of a plurality of base stations overlap with each other, the present location of the mobile station is specified to a smaller area than the radio zone of one base station on the basis of the mobile station reception radio strength levels from the plurality of base stations and the electric field strength map in the radio zone of each of the base stations. The outline of the typical arrangement of the position detection method disclosed in Japanese Unexamined Patent Publication No. 2-44929 will be described hereinbelow with reference to FIG. 20.

A radiocommunication system, introducing this prior mobile station position detection method, as shown in FIG. 20, comprises base stations 2802, 2803, 2804 respectively having radio zones 20 2805, 2806, 2807, a mobile station 2801 existing in these radio zones, a mobile communication control station 2808 for taking charge of control of communications between the base stations or between the base stations and a wire network, and a position information center 2809 for detecting the position of the mobile station 2801 on the basis of the information attainable through the mobile communication control station 2808. The positional information center 2809 is composed of a positional information transmission and reception unit 2810 for collecting information about reception radio strengths of the respective base stations 2802, 2803, 2804 and an electric field strength map 2811 indicative of the electric field strength distribution of the respective radio zones 2805, 2806, 2807.

The mobile station 2801 stands in a spot at which the radio zones 2805, 2806, 2807 of the plurality of base stations 2802, 2803, 2804 overlap with each other and, hence, can receive radio waves transmitted from the base stations 2802, 2803, 2804. If the mobile station 2801 is not in a connected communication state with a specific base station, the mobile station 2801 is capable of receiving radio signals (for example, information including identifiers of the base stations, intermittently transmitted through control channels) from these base stations 2802, 2803, 2804.

When receiving the radio signals transmitted from the base stations 2802, 2803, 2804, the mobile station 2801 measures the strength levels of these radio signals and transmits the reception radio strengths on the respective base stations 2802, 2803, 2804, together with the base station identifiers, through any one of the base stations 2802, 2803, 2804 to the mobile communication control station 2808. The mobile communication control station 2808 communicates the reception radio strengths on the base stations 2802, 2803, 2804 from the mobile station 2801, toward the positional information transmission and reception unit 2810 of the positional information center 2809. The positional information center 2810 stores the electric field strength map 2811 made in advance and representative of the electric field strength distribution in the radio zones of all the base stations, which the mobile communication control station 2808 manages, in the form of field strength contours. In the positional information transmission and reception unit 2810, on the basis of the electric field strength map 2811 on the base stations 2802, 2803, 2804, the field strength contours corresponding to the reception radio strength levels on the base stations 2802, 2803, 2804 from the mobile station 2810 are drawn to attain an area in which the respective field strength contours intersect with each other. This area is a spot detected as the position at which the mobile station exists. Thus, the position detection method disclosed in Japanese Unexamined Patent Publication No. 2-44929 can specify the position of the mobile station to within a smaller range than the radio zone of one base station, thereby realizing a position detection with a high accuracy.

However, for applying the position detection method disclosed in Japanese Unexamined Patent Publication No. 2-44929, it is necessary that the electric field strength map on the base stations constituting a service area is known in advance. In general, the electric field strength distribution on some base station is affected by various obstacles or reflectors (roads, houses, buildings and others in the outdoor places, and floors, ceilings, partitions and other in the indoor places) which exist within its radio zone, great difficulty is encountered to predict this electric field strength map from the radio wave characteristic of the base station, and therefore, detailed measurements using a field strength meter or the like are required in order to find the electric field strength map at every base station. In fact, for example, in FIG. 4 (p. 773 (61)) of "Arrangement of PHS Terminals" written by Nakamura, Akazawa, Oka and Mizutori in the Document "NTT R&D" No. 9 (Vol. 44) 1995, pp. 769 (57)–pp. 774(62), there has been shown an electric field strength distribution on a PHS base station in a house. Referring to this, the PHS electric field strength distribution obviously assumes an extremely complicated configuration in a room.

For this reason, for improving the position detection accuracy in this method, a more accurate electric field strength map is required to be obtained through measurements. However, the measurements of the electric field strength distributions on all the base stations require exceedingly expensive labor. Accordingly, the detection of the position of the mobile station with a higher accuracy than that due to the radio zone of one base station is approximately impossible or extremely difficult if taking into consideration the exceedingly expensive labor required for the production of the electric field strength map.

Moreover, for eliminating the above-mentioned problem, the report "Study on Mobile Station Position Detection Based upon Reception Level Information" Electronic Information Communication Scientific Society Autumn Meeting B-269 (1993) presents a method to specify the present location of a mobile station to within a range smaller than a radio zone of one base station through the use of mapping table of reception radio strength levels from a plurality of base stations received by the mobile station and a position (X. Y) of the mobile station by using the fact that the radio zones of the plurality of base stations overlap with each other. This position detection method will be described hereinbelow with reference to FIG. 21. For the basic data for the position detection, reception radio strength levels from a plurality of base stations are measured at points within a service area, and the positions (X, Y) of the measuring points and the radio strength levels (E1, E2, E3, E4 and E5) from base stations BS1, BS2, BS3, BS4 and BS5 received there are made to correspond to each other and accumulated in a database in a center processing section in advance. In the case of detecting the position of the mobile station, radio strength levels (E1', E2', E3', E4' and E5') received from the plurality of base stations are transmitted to a center to be checked with the closest radio strength levels of the radio strength levels accumulated in the database of the center to estimate the position (X', Y') of the mobile station. Thus, the position detection method described in the report "Study on Mobile Station Position Detection Based upon Reception Level Information" can estimate the position of the mobile station within a range smaller than the radio zone of one base station.

There is a problem which arises with this position detection method, however, in that since the estimation of the position is made in the manner that the closest reception radio strength data is retrieved in the position database, the estimated position is limited to the actual measuring points. In addition, in general the recognition of a place is made with a floor or room number in the case of an indoor place and with a building or inherent area name in the case of an outdoor place, and the recognition using the coordinates is inconvenient in many cases. Accordingly, in the case of detecting the position expressed with such a discrete value, it is considered that this position detection method is made such that, for example, the correspondence between room numbers and coordinates is prepared in advance and the estimated position of the mobile station is converted into a room number. However, the the position estimated in terms of a room greatly differs from the position estimated with respect to the vicinity of the boundary between rooms, and hence, even if the closest point is specified on the reception radio strength levels, the error rate increases so that difficulty is encountered to know the degree of the reliability of the position detection.

SUMMARY OF THE INVENTION

The present invention has been developed in order to eliminate the above-mentioned problems, and it is therefore an object of the present invention to provide a radio mobile station position detection method which is capable of accurately and simply finding the position of a mobile station to promote the reliability of the position detection and a radiocommunication system based upon the aforesaid position detection method of the mobile station.

In a position detection method of a mobile station according to the present invention, the mobile station measures the reception radio wave (electric field) strength levels from a plurality of base stations at a measuring point to convey the measurement results through a base station to a control station, while the control station uses a neural network to learn a correlation between the reception radio strength levels and the position of the mobile station on the basis of the measurement results at a plurality of measuring points and the positional data at the measuring points. Further, when the mobile station sends the measurement results of the reception radio strengths from the plurality of base stations measured at the plurality of measuring points, the control station estimates the position of the mobile station bearing the measurement results on the correlation between the reception radio strength levels and the positions of the mobile station obtained through the learning.

In addition, the control station communicates the structure of the neural network experiencing the learning to the mobile station, so that the mobile station measures the reception radio strength levels from the plurality of base stations to detect its own present position on the basis of the measurement results. Further, the plurality of base stations measure the reception ratio strength level from the mobile station at a measuring point and conveys the measurement results to the control station which in turn, learns the correlation between the reception radio strength level at each of the base stations and the position of the mobile station through the neural network on the basis of the measurement result in each of the respective base stations and the positional data at the measuring point. When the respective base stations transmit the measurement results on the reception radio strength levels of the radio wave emitted from the mobile station at a given point, the control station estimates the position of the mobile station on the basis of the correlation it learns.

Furthermore, in a wireless radiocommunication system according to the present invention, a mobile station is equipped with radio strength measuring means for measuring the reception radio strength levels from a plurality. of base stations, whereas a control station is provided with position input means for accepting or inputting the position of a measuring point, position learning processing means for learning, through a neural network, the correlation between the reception radio strength levels measured by the mobile station at a plurality of measuring points and the position of the measuring point inputted from the position inputting means, and position estimation processing means for, using the reception radio strength levels from the plurality of base stations measured by the mobile station at a given point, estimating the position of the mobile station at the measuring time on the basis of the correlation the position learning processing means learns.

In addition, the mobile station is equipped with learning result storage means for storing parameters of the neural network conveyed from the control station and position calculation means for constructing a neural network through the use of the parameters to detect its own position. Further, each of the base stations is provided with radio strength measuring means while the control station includes position input means for accepting the position of the measuring point, position learning processing means for learning, through a neural network, the correlation between the reception radio strength levels from the mobile station measured by the respective base stations and the position of the measuring point, and position estimating means for estimating the position of the mobile station on the basis of the reception radio strength levels from the mobile station measured by the respective base stations.

Thus, according to this invention, since the detection of the position of the mobile station is accomplished through the learning by the neural network, the measuring work at the preparation stage is satisfied with the measurements of the reception radio strength levels at a typical measuring point, with the result that the working quantity can be reduced in the preparation stage.

In accordance with an aspect of the present invention, in a position detection method for detecting a mobile station in a wireless radiocommunication system including the mobile station, base stations and a control station, the mobile station measures the reception radio strength levels from a plurality of base stations at a measuring point and communicates the measurement results through the base station to the control station which in turn, learns, through a neural network, the correlation between the reception radio strength levels and the position of the mobile station on the basis of the measurement results at a plurality of measuring points and the positional data of the measuring points, and when the mobile station conveys the measurement results of the reception radio strength levels from the plurality of base stations measured at a given point through the base station to the control station, the control station estimates the position of the mobile station producing the measuring results on the basis of the correlation between the reception radio strength levels and the positions of the mobile station attained through the learning. Accordingly, owing to the learning of the correlation between the positions of the mobile station and the reception radio strength levels from the plurality of base stations at that point, the estimation of the position of the mobile station is possible on the basis of the electric field strength levels of the plurality of base stations the mobile station receives at the given point.

Furthermore, another aspect of this invention is that the measuring points are determined in advance and each of the mobile stations measures the reception radio strength levels from a plurality of base stations at its own measuring point so that the learning is made of the correlation between the reception radio strength levels measured at the measuring point predetermined in position beforehand and the position of the measuring point. Still further, the measuring point is set to a place at which a charger for charging the mobile station stands so that the reception radio strength levels are measured and reported to the control station while the mobile station is located on the charger known in position for the charging. The control station learns the aforesaid correlation on the basis of the positional data of the charger and the reported reception radio strength levels.

Moreover, a further aspect of this invention is that the mobile station communicates the positional data of a measuring point and the reception radio strength levels from a plurality of base stations measured at the measuring point through the base station to a control station. The mobile station measures the reception radio strength levels from the plurality of base stations and inputs its own position through the input by the user or through a position detection unit to report both the measured reception radio strength levels and its own position to the control station. The control station learns the aforesaid correlation on the basis of the position of the mobile station and the reception radio strength levels at that point.

In addition, a further aspect of this invention is that the mobile station measures the reception radio strength levels from a plurality of base stations plural times at the same measuring point or an arbitrary point and statistically processes the plurality of measurement values to output the obtained single value as a final measurement result, which can enhance the accuracy of the measurement result in the mobile station. Further, when the mobile station conveys the measurement results of the reception radio strength levels from a plurality of base stations measured at an arbitrary point through the base station to the control station, the control station estimates the position of the mobile station corresponding to the measurement results on the basis of the correlation between the reception radio strength levels and the positions of the mobile station obtained through the learning and communicates the estimation result to the mobile station. Accordingly, the user who carries the mobile station can find his own position through the inquiry to the control station.

Furthermore, a further aspect of this invention is that, when a mobile station inquires for the position of a different mobile station, a control station gives instructions to the different mobile station to measure the reception radio strength levels from a plurality of base stations and to report them, and in response to the report of the measurement results, the control section estimates the position of the different mobile station on the basis of the measurement results and conveys the estimation result to the mobile station which made the inquiry therefor. Accordingly, the user who carries the mobile station can find the position of a person carrying the different mobile station by the inquiry to the control station.

Still further, a control station successively stores the estimation results of the position of a mobile station, and when estimating the position of the mobile station on the basis of a new measurement result, the control station decides, on the basis of the past positions of the mobile station, whether or not the estimated position of the mobile station is appropriate. If not appropriate, the control station gives instructions to the mobile station to again make the measurements. Thus, the reliability of the estimation results can improve through this procedure. Besides, the mobile station measures the reception radio strength levels from a plurality of base stations at a given equal time interval and conveys the measurement results through the base station to the control station. The control station obtains the position of the mobile station at the equal time interval on the basis of the measurement results and stores them in time series, with the result that it is possible to more accurately judge the appropriateness of the position of the mobile station newly estimated.

In addition, a further aspect of this invention is that a control station converts the reception radio strength level transmitted from a mobile station into a theoretical distance between the mobile station and a base station and learns, through a neural network, the correlation between this theoretical distance and the position of the mobile station, so that the learning processing becomes easy and the improvement of the learning accuracy becomes possible.

Moreover, in a position detection method for detecting the position of a mobile station in a wireless radiocommunication system equipped with the mobile station, a plurality of base stations and a control station according to this invention, the mobile station measures the reception radio strength levels from the plurality of base stations at a measuring point and communicates the measurement results through the base station to the control station, which in turn, learns, through a neural network, the correlation between the reception radio strength levels and the positions of the mobile station on the basis of the measurement results at a plurality of measuring points and the positional data of the measurement points and further conveys the parameters of the neural network obtained through the learning to the mobile station, while the mobile station constructs a neural network through the use of the parameters and detects its own position on the basis of the reception radio strength levels from the plurality of base stations measured at an arbitrary point through the use of the constructed neural network. With this method, the mobile station can detect its own position without the inquiry to the control station.

In addition, a control station learns, through a neural network, the correlation between the reception radio strength levels and areas such as a room and a zone having an extension in which a mobile station stands, with the result that the room or zone in which a person carrying the mobile station exists is detectable and it is possible to present a plurality of places as the candidates for the person's whereabouts.

Furthermore, in a position detection method for detecting the position of a mobile station in a wireless radiocommunication system equipped with the mobile station, base stations and a control station, each of the base stations measures the reception strength level of a radio wave emitted from the mobile station standing at a measuring point and conveys the measurement result to the control station, while the control station learns, through a neural network, the correlation between the reception radio strength levels and the positions of the mobile station on the basis of the measurement results at a plurality of measuring points and the positional data of the measuring points, and when each of the base stations measures the reception radio strength level of a radio wave emitted from the mobile station standing at an arbitrary point and conveys the measurement result to the control station, the control station estimates the position of the mobile station bearing the measurement results on the basis of the correlation between the reception radio strength levels and the positions of the mobile station obtained through the learning. Thus, it is easily applicable to a system such as a mobile radio telephone system and PHS where a plurality of base stations measures the radio wave transmitted from a mobile station.

Moreover, in a wireless radiocommunication system equipped with a mobile station, base stations and a control station and allowing the control station to detect the position of the mobile station, the mobile station is equipped with radio strength measuring means for measuring reception radio strength levels from a plurality of base stations, while the control station is provided with position input means for receiving the position of a measuring point, a position learning processing means for learning, through a neural network, the correlation between the reception radio strength levels by the mobile station at a plurality of measuring points and the positions of the measuring points inputted through the position input means, and position estimation processing means for estimating, on the basis of the reception radio strength levels from the plurality of base stations measured by the mobile station at an arbitrary position, the position of the mobile station at the measuring time through the use of the correlation the position learning processing means learn. Thus, the detection method based upon the learning by the neural network is practicable for the position detection of the mobile station.

Furthermore, a mobile station is equipped with radio strength measuring means for measuring the reception radio strength levels from a plurality of base stations, whereas a control station is provided with position storage means for storing the position of each of measuring points and an identifier of the mobile station corresponding to the measuring point, position learning processing means for learning, through a neural network, the correlation between the reception radio strength level measured at the measuring point by the mobile station and the position of the measuring point stored in the position storage means, position estimation processing means for estimating the position of the mobile station at the measuring time on the basis of the reception radio strength levels from the plurality of base stations measured by the mobile station at an arbitrary point through the use of the correlation the position learning processing means learns. This system can adopt a position detection method in which the learning is conducted using the reception radio strength level measured by a predetermined mobile station at a predetermined measuring point.

In addition, for charging a mobile station is located at a measuring point, so that the mobile station reports the reception radio strength level measured during the charging to a control station whereas the control station learns using the reception radio strength level and the position of the charger known in advance. Further, at the position of the measuring point, there are situated a learning data collector provided with radio strength measuring means for measuring reception radio strength levels from a plurality of base stations and transmission and reception means for transmitting the measured radio strength levels through the base station to a control station and further for receiving a control signal from the control station, with the result that the control station can learn using the reception radio strength levels sent from the learning data collector at regular intervals or in accordance with commands.

Furthermore, a mobile station is equipped with radio strength measuring means for measuring the reception radio strength levels from a plurality of base stations and position input means for taking in its own position information, whereas a control station is provided with position learning processing means for learning, through a neural network, the correlation between the reception radio strength levels measured by the radio strength measuring means of the mobile station and the position of the mobile station at the measuring point inputted from the input means and for storing the learned correlation therebetween, and position estimation processing means for estimating the position of the mobile station at the measuring time on the basis of the reception radio strength levels from the plurality of base stations measured by the mobile station at an arbitrary point through the use of the correlation the position learning processing means learns. This system can realize a position detection method in which the mobile station takes in its own position through the operation by the user or through a different position detection device in addition to the measured reception radio strength levels and the control station learns using these data.

Furthermore, the control station is equipped with radio strength report requesting means for transmitting a radio strength report requesting message to the mobile station so that the mobile station measures the reception radio strength levels from the plurality of base stations and reports the measurement results thereto. Accordingly, the control station can request the radio strength measurement data from an arbitrary mobile station when necessary. Still further, the mobile station is equipped with self mobile station position inquiry means for issuing a measurement request for radio strength levels to the radio strength measuring means, and when receiving the reception radio strength levels measured by the radio strength measuring means, the control station estimates the position of the mobile station and informs the mobile station of the estimation result. In this system, the user of the mobile station can operate the self mobile station position inquiry means to inquire to the control station for its own present position. In addition, the mobile station is provided with different mobile station position inquiry means for transmitting a request for the inquiry for the position of a different mobile station to the control station, and when the control station receives this request, the radio strength report requesting means issues a radio strength report request message to the different mobile station whose position is inquired and, in response to the report on the measurement result of the radio strength levels from the different mobile station, the control station estimates the position of the different mobile station on the basis of measurement result to inform the mobile station, which made the inquiry, of the estimation result. According to this system, the user who carries the mobile station can operate the different mobile station position inquiry means to inquire to the control station for the position of the person who carries the different mobile station.

Moreover, the control station is equipped with position accumulation means for accumulating the information on the positions of the mobile station estimated in the position estimation processing means in time series and history decision means for deciding, on the basis of the transition of the position of the mobile station with time accumulated in the position accumulation means, whether the position of the mobile station estimated by the position estimation processing means is appropriate or not. If the history decision means makes a decision to that it is not appropriate, the radio strength report requesting means transmits the radio strength report requiring message to the mobile station. According to this system, in the case that an inproper estimation result arises due to a large variation of the electric field distribution of the base station, the measurement is resumed, thus enhancing the accuracy of the estimation result.

In addition, the mobile station is equipped with at least two frequency synthesizers, and even if one frequency synthesizer synchronizes with a communication carrier at the call, the radio strength measuring means measures the radio strength levels from a plurality of base stations through the use of the other frequency synthesizer. Thus, the mobile station can perform the measurements of the reception radio radio strength levels irrespective of the call. Further, the control station is provided with distance calculation means for calculating the distance between the mobile station and each of the base stations as a function of of the reception radio strength levels from a plurality of base stations measured by the mobile station through the use of a theoretical electric field strength distance characteristic obtainable from the outputs and frequencies of the base stations, and the position learning processing means learn, through a neural network, the correlation between the calculated distance and the position of the measuring point. This system permits the position estimation with a high accuracy through the use of the calculated theoretical distance for the learning.

Furthermore, the mobile station is equipped with learning result storage means for storing the parameters for a neural network conveyed from the control station and position calculation means for constructing a neural network using the parameters stored in the learning result storage means to detect its own position on the basis of the reception radio strength levels from a plurality of base stations measured at an arbitrary point through the use of the constructed neural network. This system can adopt the above-mentioned position detection method in which the mobile station detects its own position without the inquiry to the control station. Still further, the control station learns the correlation between the reception radio strength levels and the area in which the mobile station stands, through a neural network including nodes of an input layer accepting the reception radio strength levels from a plurality of base stations and nodes of an output layer corresponding in number to the areas defining the range of an object under detection such as a room and a zone. This system can conduct the above-mentioned position detection method which detects the room or zone where a person carrying the mobile station exists or presents a plurality of places as the candidates for the person's whereabouts.

Moreover, in a wireless radiocommunication system equipped with a mobile station, base stations and a control station and made such that the control station detects the position of the mobile station, each of the base stations is provided with radio strength measuring means for measuring the reception radio strength level from the mobile station, while the control station is equipped with position input means for accepting the position of a measuring point, position learning processing means for learning, through a neural network, the correlation between the reception radio strength level of the radio wave emitted from the mobile station at the measuring point and measured by the base station and the position of the measuring point inputted through the position input means, and position estimation processing means for estimating the position of the mobile station on the basis of the reception radio strength level from the mobile station measured by each of the base stations through the use of the correlation the position learning processing means learns This system can introduce the above-mentioned position detection method in which a plurality of base stations measure the radio wave from the mobile station to detect the position of the mobile station.

In addition, in a mobile station position detection method according to this invention, the radio strength levels from a plurality of base stations at a measuring point within a service area are measured plural times and accumulated in a radio strength data storage section which makes a corresponding relation (mapping) between the reception radio strength levels and a position expressible with a continuous value such as coordinate, and the reception radio strength levels in the radio strength data storage section are compared with reception radio strength levels at a position detecting point at the time of the position detection, and when a position detection section estimates the position of the mobile station by introducing such a statistic method as to calculate a weighted mean of a plurality of radio strength data that the radio strength level comparison result shows a small error. Accordingly, the estimated position is not limited to the actual measurement point and the position of the mobile station can be estimated within a range smaller than a distance between the measuring points.

Furthermore, of the reception radio strength levels and the position coordinates accumulated in a radio strength data storage section, the position coordinates are accumulated as a position expressible with a discrete value, and the radio strength data in the radio strength data storage section are compared with the reception radio strength levels at the position detection so that the position of the mobile station is estimated by employing a statistic method in which, for example, a position detection control section makes a majority decision using a plurality of radio strength data that the radio strength comparison result shows a small error, and the degree of the reliability of the position detection is found through, for example, a statistic method to use the rate of the estimated position to a plurality of extracted radio strength data.

According to this invention, a wireless radiocommunication system which performs radiocommunications between a mobile station and a base station is equipped with radio strength data storage section for retaining positional information on a plurality of measuring points expressible with continuous values and radio strength data including reception radio strength levels from a plurality of base stations at the respective measuring points, a position detection section having means for comparing the radio strength data in the radio strength data storage section with radio strength levels at a position detecting point to estimate the position, an error radio strength. data storage section for holding a plurality of radio strength data involving a small error on the comparison in the position detection section, and the position detection section performs the position detection using the plurality of radio strength data in the error radio strength data storage section. Thus, the estimated position is not limited to the actual measuring point but the position can be estimated with a range smaller than the interval between the measuring points.

Furthermore, according to this invention, a wireless radiocommunication system which performs radiocommunications between a mobile station and a base station is equipped with radio strength data storage section for retaining positional information on a plurality of measuring points expressible with discrete values and radio strength data including reception radio strength levels from a plurality of base stations at the respective measuring points, a position detection section having means for comparing the radio strength data in the radio strength data storage section with radio strength levels at a position detecting point to estimate the position, an error radio strength data storage section for holding a plurality of radio strength data which produce a small error in the comparison in the position detection section, and the position detection section performs the position detection expressible with the discrete values, using the plurality of radio strength data in the error radio strength data storage section. At the position detection, the radio strength data in the radio strength storage section is compared with the reception radio strength levels taken for the position detection, and a position detection control section estimates the position by, for example, employing a statistic method to make a majority decision on the plurality of radio strength data in the error radio strength data storage section which make a small comparison error and further estimates the degree of the reliability of the obtained position by, for example, employing a statistic method to calculate the rate of the estimated position to the plurality of radio strength data.

In addition to these arrangements, a position detection knowledge section is provided which has a knowledge on a person carrying the mobile station and an action rule or schedule of that person, and the position detection section carries out the position detection through the use of the plurality of radio strength data in the error radio strength data storage section and the knowledge in the position detection knowledge section. Because of using the knowledge on a person and an action rule and schedule of that person at the position estimation, it is possible to remove data with a low possibility of movements such as the inhibition of entry into a room but to select data with a high possibility of movements, with the result that the position detection can improve in accuracy.

Furthermore, a position detection knowledge section is provided which has knowledge on the relationship between a plurality of positions expressible with discrete values, and the position detection section conducts the position detection using a plurality of radio strength data in the error radio strength data storage section and the knowledge in the position detection knowledge section. Through the use of the knowledge on the relationship between the plurality of positions expressible with discrete values, it is possible to exclude, of the plurality of radio strength data held in the error radio strength data storage section, the data remote in connection, and it is possible to decide whether or not it corresponds to the vicinity of the boundary between rooms, thus developing the position detection accuracy.

Still further, the position detection is conducted in such a 5 manner that the number of radio strength data held in the error radio strength data storage section is changed in accordance with the degree of the error between the radio strength levels at the position detecting point and the radio strength data in the radio strength data storage section. Since the number of the radio strength data in the error radio strength data storage section varies in accordance with the degree of the error, the improvement of the position detection accuracy is possible.

Moreover, the position detection section is equipped with a position accumulation section for accumulating short-term positions the position detection section estimates in the past and a history decision section for deciding the appropriateness of the estimated position on the basis of the radio strength data held in the error radio strength data storage section. The appropriateness of the estimated position is judged in a manner that the moving situation is decided on the basis of the latest estimated position of the mobile station in the past and that time and further the present position and the time at that position. If not appropriate, the position detection is again conducted. Since the moving speed or the locus is calculated on the basis of the short-term history to decide the appropriateness of the estimated position, the position detection can improve in accuracy.

In addition, in place of accumulating the short-term positions estimated in the past, a long-term history is established and held by accumulating the past experiences such as the places to which the mobile station has moved in the past and the frequency of the movements in the short terms to decide, on the basis of the past movement experiences of the mobile station, whether the estimated position is appropriate or not. If not appropriate, the position detection is again conducted. Since the appropriateness of the position estimated by the possible movement range of the mobile station on the past experiences of the mobile station is judged from the long-term history, the improvement of the position detection accuracy is possible.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Figure 1:
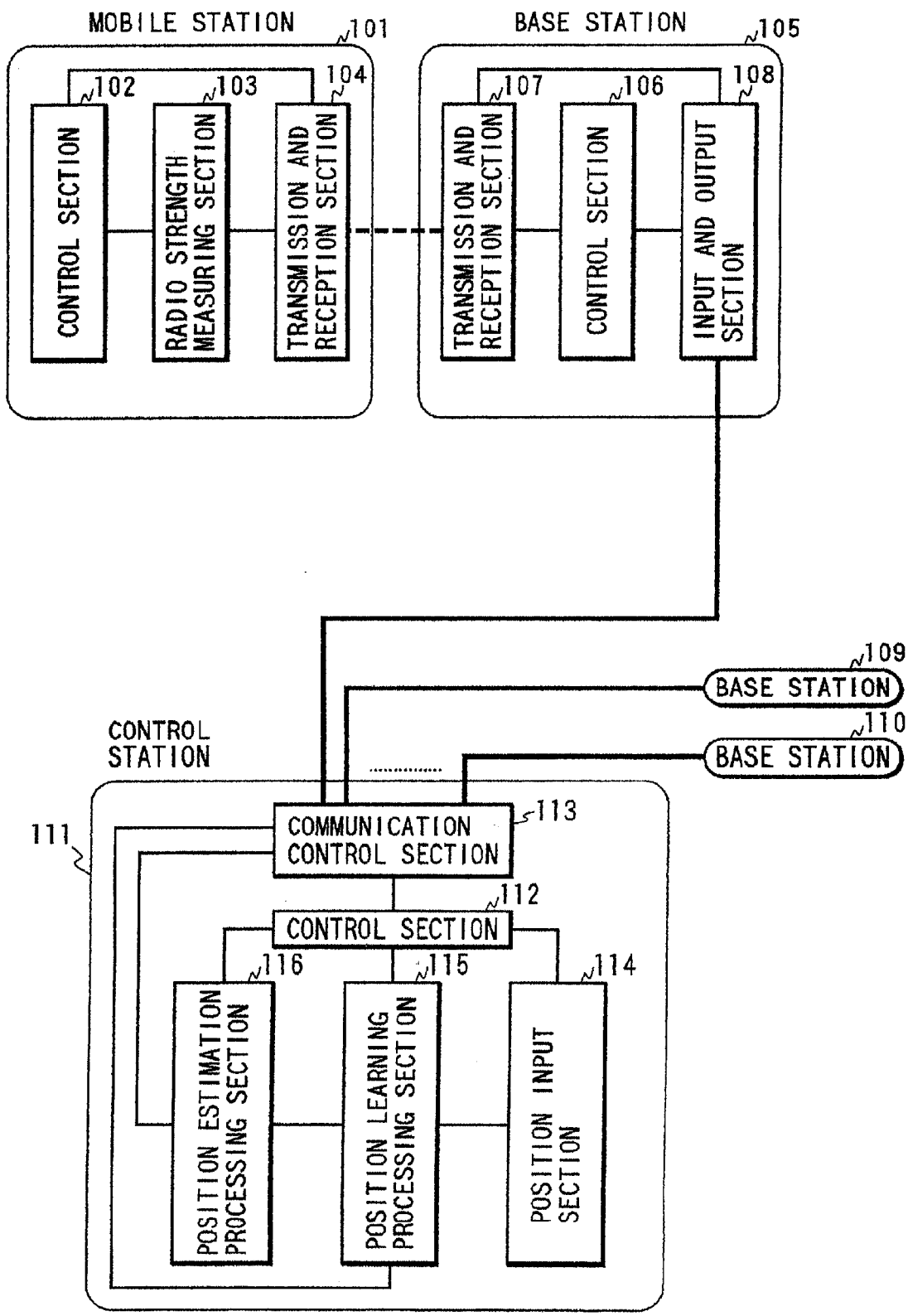
FIG. 1 is a block diagram showing an arrangement of a radiocommunication system which adopts a position detection method according to a first embodiment of the present invention.

Referring now to the drawings, a description will be made hereinbelow of embodiments of the present invention.

First Embodiment

A mobile station position detection method according to a first embodiment of this invention is such that the relationship between the radio strength levels from a plurality of base stations and the position of a mobile station is learned through a neural network to estimate the position of the mobile station on the basis of the radio strength levels measured by the mobile station. In a radiocommunication system which introduces this detection method according to the first embodiment is, as shown in FIG. 1, a mobile station 101 is composed of a mobile station control section 102 for controlling the operation of the mobile station 101, a radio strength measuring section 103 for measuring the radio strength level of a signal from a base station(s) and a mobile station transmission and reception section 104 for signal transmission and reception, and a base station 105 is made up of a base station control section 106 for controlling the operation of the base station 106, a base station transmission and reception section 107 for signal transmission and reception to and from the mobile station 101, and a base station input and output section 108 for signal transmission and reception to and from a control station 111 through a wire line, and further the control station 111 is equipped with a control station control section 112 for controlling the operation of the control station 111, a communication control section 113 for controlling the communication with the base station 105, a position input section 114 for undergoing the input of coordinate data on a radio strength measuring point, position learning processing section 115 for learning, through a neural network, the correlation between the position of the mobile station 101 and the reception radio strength level at that point and for storing the correlation therebetween, and a position estimation processing section 116 for estimating the position of the mobile station 101 on the basis of the measured radio strength level through the use of the stored correlation. In FIG. 1, numerals 109 and 110 represent different base stations each having the same arrangement as that of the base station 105.

Figure 2:
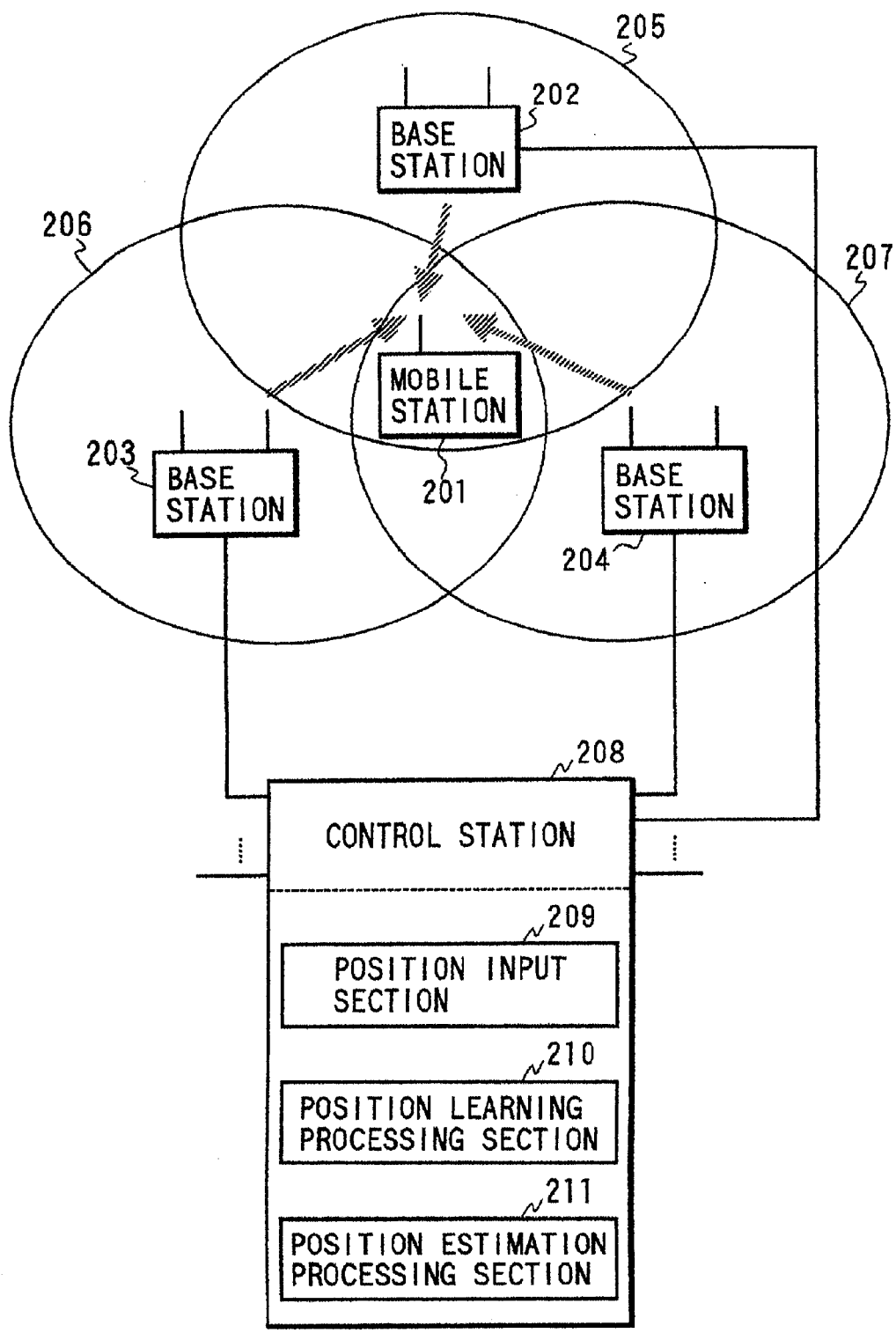
FIG. 2 is an illustration of an image of the radiocommunication system based upon the position detection method according to the first embodiment.

FIG. 2 shows a system image of this radiocommunication system. The system comprises a mobile station 201, base stations 202, 203, 204 respectively having radio zones 205, 206, 207, and a control station 208 equipped with a position input section 209, a position learning processing section 210 and a position estimation processing section 211. In this system, in cases where as shown in FIG. 2 the mobile station 201 simultaneously stands within the radio zones 205, 206, 207 of the plurality of base stations 202, 203, 204, the detection of the position of the mobile station 201 is made on the basis of the strength levels of the radio waves from the base stations 202, 203, 204, measured by the mobile station 201, by means of the functions of the position input section 209, the position learning processing section 210 and the position estimation processing section 211 belonging to the control station 208.

For the position detection of the mobile station, the operation of the system comprises two modes: a learning mode and an estimation mode. In the learning mode, the position coordinates corresponding to a plurality of predetermined measuring points are inputted through the position input section 114 of the control station 111 and stored in the position learning processing section 115. At this time, numbers indicative of the order of the measurements are assigned to the measuring points, and the coordinate system representative of the positions of the measuring points is singly determined in areas where the position detection is made. When the information on the measuring points are conveyed through some means to the mobile station 101 side, if the measuring points are indicated with points on a map, the mobile station 101 is transferred to the indicated points in the order of measurements, i.e., in the order of the numbers of the measuring points, where the mobile station transmission and reception section 104 receives radio waves from the base stations 105, 109 and 110 and the radio strength measuring section 103 measures the reception radio strength levels of the signals therefrom. The mobile station transmission and reception section 104 transmits the measurement data to the base station 105 which produces the highest radio strength level.

When in the base station 105 the base station transmission and reception section 107 receives the reception radio strength data from the mobile station 101, the base station control section 108 decides the kind of data and transmits it through the input and output section 108 to the control station 111. In the control station 111, the communication control section 113 receives the reception radio strength data from the mobile station 101 through the base station 105 and the control station control section 112 decides the reception of the reception radio strength data and hands it over to the position learning processing section 115. Thus, the reception radio strength data are communicated from the mobile station 101 to the position learning processing section 115 in the order of measurements, so that the correspondence (mapping) is made between the position coordinates of the respective measuring points inputted in advance through the position input section 114 and the reception radio strength data from the mobile station 101 at the respective measuring points.

Figure 3:
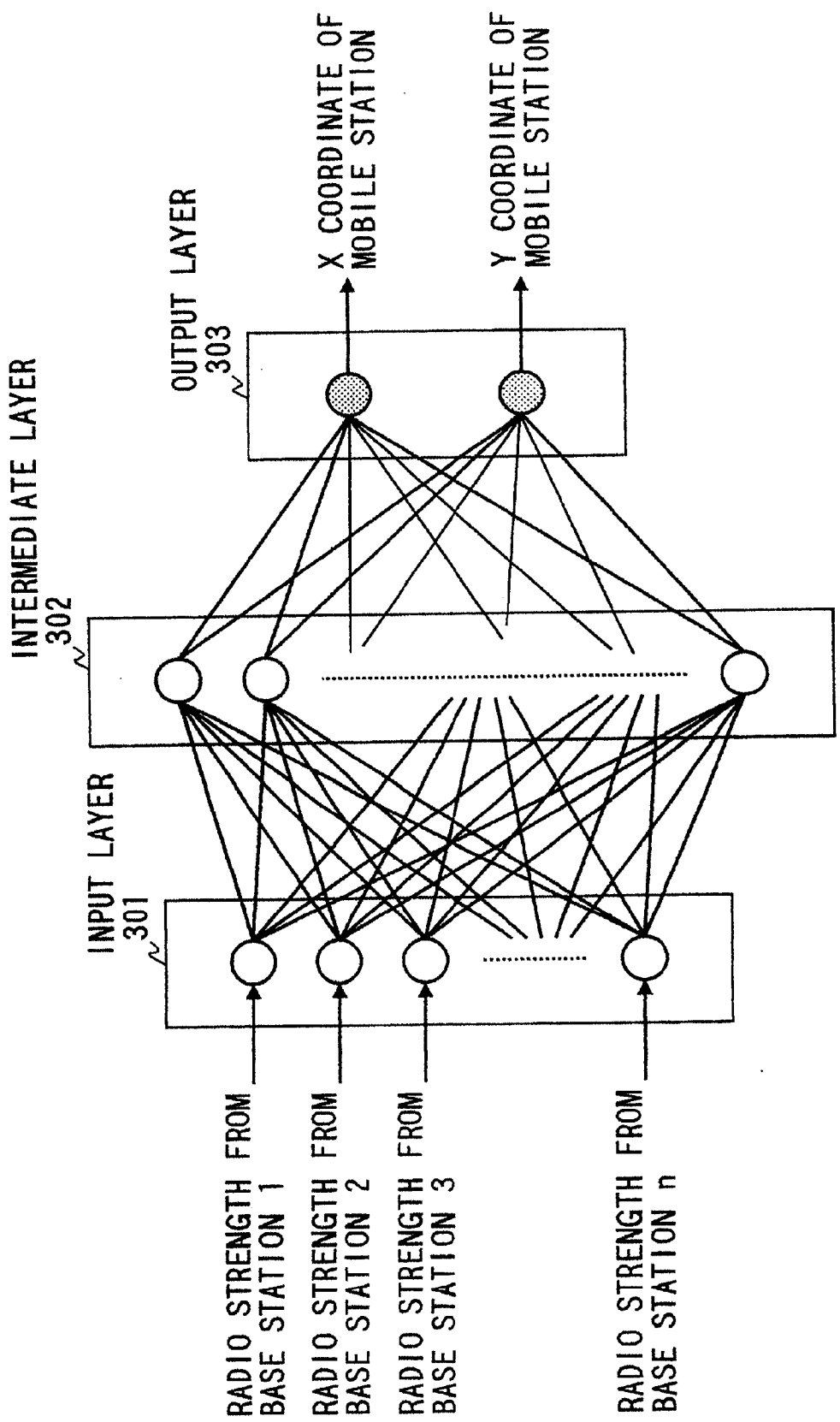
FIG. 3 shows an example of a structure of a neural network to be used in a position learning processing section of the radiocommunication system for the position detection method according to the first embodiment.

The learning in the position learning processing section 115 is made through the use of a neural network, for example, as shown in FIG. 3. In FIG. 3, numeral 301 represents an input layer, numeral 302 depicts an intermediate layer and numeral 303 denotes an output layer. This neural network has a layered perceptron structure made such that, when the reception radio strength levels due to base stations from a mobile station are inputted into the nodes of the input layer 301, the position coordinates of the mobile station at that measuring point are outputted from the output layer 303. In this neural network, appropriate continuous functions such as the sigmoid functions are used as the input and output functions for the nodes. This neural network is not a special neural network but is well known as being written as a typical example in the references, and the detailed description thereof will be omitted for brevity. As the references, there are "Mathematical Theory of Neural Networks" published by Sangyo Tosho (1978), written by Shunichi AMARI and "Information Processing of Neural Network" published by Sangyo Tosho (1988), written by Hideki ASO.

In the position learning processing section 115, the position coordinates of the measuring points and the reception radio strength levels in the mobile station 101 at the measuring points, which are made in the corresponding relation to each other, are used as the learning data for the neural network (in this case, the reception radio strength levels serve as the input signals and the position coordinates act as the teacher signals). First, the reception radio strength levels due to a plurality of base stations in the mobile station 101 standing at the measuring point are inputted into the nodes of the input layer 301, respectively. At this time, the neural network learns so that the output values from the nodes of the output layer 303 after passing through the intermediate layer 302 coincide with the position coordinates of the measuring point. More specifically, the weights on connections between the nodes of the input layer 301 and the nodes of the intermediate layer 302 and the weights on connections between the nodes of the intermediate layer 302 and the nodes of the output layer 303 are adjusted to reduce the error between the actual outputs (the values of the outputs of the output layer 303 when the input layer 301 receives the radio strength values) and the correct position coordinates. This learning rule is generally referred to as a back propagation, but this embodiment is not limited to this method. The details about the learning rules are also well known, and the description thereof will be omitted (see the above-mentioned references).

In terms of all the measuring points, through the input of the reception radio strength levels due to the respective base stations in the mobile station 101, the learning for the output of the position coordinates is made till the convergence (for example, the convergence condition is that the sum of errors at each of the measuring points comes to below a given value). After the completion of the learning, the position learning processing section 115 passes the weights on connection between the input layer 301 and the intermediate layer 302 the the weights on connections between the intermediate layer 302 and the output layer 303 to the position estimation processing section 116 which in turn, stores them. This is the operations in the learning mode.

In the estimation mode, the actual position detection function works here to estimate the present position of the mobile station. In the mobile station 101, the mobile station transmission and reception section 104 receives receivable radio wave signals from a plurality of base stations at a timing according to the input instructions from the user at an arbitrary point, at an operational timing on the system or at a constant time interval. Subsequently, the radio strength measuring section 103 measures the radio wave signals therefrom (the reception and measurement timings are under the control of the mobile station control section 102), and the transmission and reception section 103 transmits this reception radio strength data to, for example, the selected base station 105 which causes the highest radio strength level. In the base station 105, the base station transmission and reception section 107 receives the reception radio strength data from the mobile station 101, while the base station control section 106 judges the kind of data and sends it through the input and output section 108 to the control station 111.

In the control station 111, the communication control section 113 receives the radio strength data from the mobile station 101 through the base station 105 and the control station control section 112 decides the reception thereof and hands it over to the position estimation processing section 116. The position estimation processing section 116 constructs a neural network with the same structure as that of the neural network used at the learning on the basis of the weights on connections fed from the position learning processing section 115. Further, the reception radio strength data due to the plurality of base stations in the mobile station 101 are inputted to the constructed neural network to obtain as outputs the position coordinates of the mobile station 101 at the time that the mobile station 101 measures and reports the reception radio strength levels. Thus, the position estimation processing section 116 estimates and detects the position of the mobile station 101 on the basis of the reception radio strength levels due to the plurality of base stations in the mobile station 101. The accuracy of the position detection depends upon the learning result in the learning mode, and in general, on the learning characteristic of the neural network, the accuracy thereof can improve in such a manner as to increase the number of measuring points or the number of times of measurements at the measuring points in the learning mode.

Although in the above description the operation of the radiocommunication system is divided into the learning mode and the estimation mode, it is also possible that the control station 111 makes the switching between these operational modes in a clear expression or the control station control section 112 switches the operation in accordance with the kind of data in a state where the mode information indicative of the kind of data is added to the reception radio strength data the mobile station 101 reports.

Further, although the mobile station used in the learning mode and the mobile station used in the estimation mode are described as the mobile station 101 in FIG. 1, there is no need for these mobile stations being the same.

Second Embodiment

Figure 4:
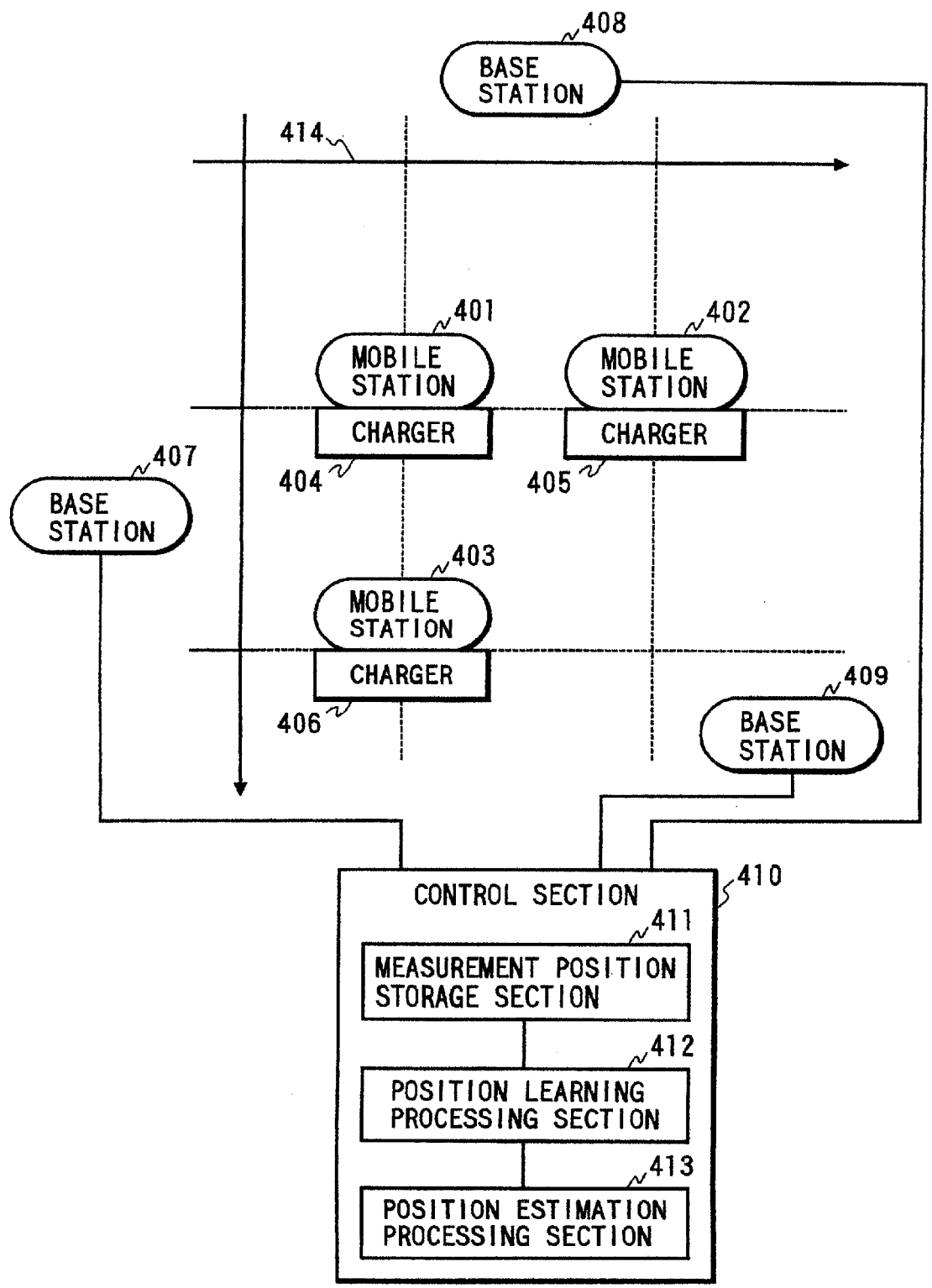
FIG. 4 is an arrangement of a radiocommunication system which introduces a position detection method according to a second embodiment of this invention.

A description will be made hereinbelow of a position detection method of a radio mobile station according to a second embodiment of this invention. This detection method is to make a neural network learn in a way that the position of a charger for the mobile station is treated as a measuring point. A radiocommunication system based on this detection method is, as shown in FIG. 4, equipped with mobile stations 401, 402, 403, chargers 404, 405, 406 for charging the mobile stations 401, 402, 403, base stations 407, 408, 409, and a control station 410. The control station 410 is made up of a measurement position storage section 411 for storing the positional information on the measuring points predetermined in position, a position learning processing section 412 for learning, through a neural network, the correlation between the measuring points the reception radio strength levels at the measuring points and for storing the correlation therebetween, and a position estimation processing section 413 for estimating the position of the mobile station on the basis of the measured radio strength values through the use of the correlation. In FIG. 4, numeral 414 designates a coordinate system.

This system is made taking into consideration the case that the chargers are fixedly disposed at predetermined positions, for example, the case that a charger is fixedly placed on a disk of each person in a firm. In this case, the positions of the respective chargers are expressed with the predetermined coordinate system 414 (the coordinate system can freely be set), and the position coordinates thereof are stored in the measurement position storage section 411 of the control station 410. Now, let it be assumed that the mobile stations 401, 402, 403 simultaneously exist within the radio zones of the base stations 407, 408, 409 and are set on the arbitrary chargers 404, 405, 406, respectively. At this time, the mobile stations 401, 402, 403 detect that they are in the charged conditions, and obtain the charger identification information from the chargers 404, 405, 406, respectively, and further measure the reception radio strength levels from the base stations 407, 408, 409.

Secondly, the mobile stations 401, 402, 403 reports the charger identification information and the reception radio strength levels from the base stations 407, 408, 409 through one of the base stations 407, 408, 409 to the control station 410. In response to the report therefrom, in the control station 410, the position learning processing section 412 obtains the position coordinates corresponding to the reception radio strength levels measured and reported by the mobile stations 407, 408, 409 referring to the positional information on all the chargers stored in advance in the measurement position storage section 411, i.e., the position coordinates expressed by the coordinate system 414. Further, as well as the first embodiment, for the learning a neural network is constructed which receives as inputs the reception radio strength levels from the respective base stations at each position and outputs the corresponding position coordinates, and the weights on connections between the nodes in the neural network are stored as the learning results in the position estimation processing section 413.

In this way, for collecting the data for learning of the correlation between the reception radio strength levels from the plurality of base stations in the mobile stations and the positions of the mobile stations, the plurality of mobile stations are used and the reception radio strength levels therefrom are measured at the known positions of the chargers. Accordingly, it is possible to simplify the input of the position coordinates of the measuring points. In addition, since the measurements of the reception radio strength levels are always possible while the mobile stations are in the charged conditions, it is possible to collect large amount of data, thus enhancing the position detection accuracy.

Although in this embodiment the positions of the chargers are fixed to obtain the position coordinates of the measuring points for the learning data (reception radio strength levels), if the correspondence between the chargers and the mobile stations is made in advance, it is also possible to adopt a method of specifying the mobile station learning data measuring point without obtain the identification information from the chargers or a method of determining the learning data measuring point at every mobile station. Further, it is also appropriate that, for collecting the learning data, on the measuring point there are provided a learning data collector equipped with only a radio strength measuring section for measuring the reception radio strength levels from a plurality of base stations and a transmission and reception section for transmitting the reception radio strength levels through the base station to the control station and further for receiving a control signal from the control station. In this embodiment, the operation of the radiocommunication system in the position estimation mode is the same as that in the position estimation mode in the first embodiment.

Third Embodiment

Figure 5:
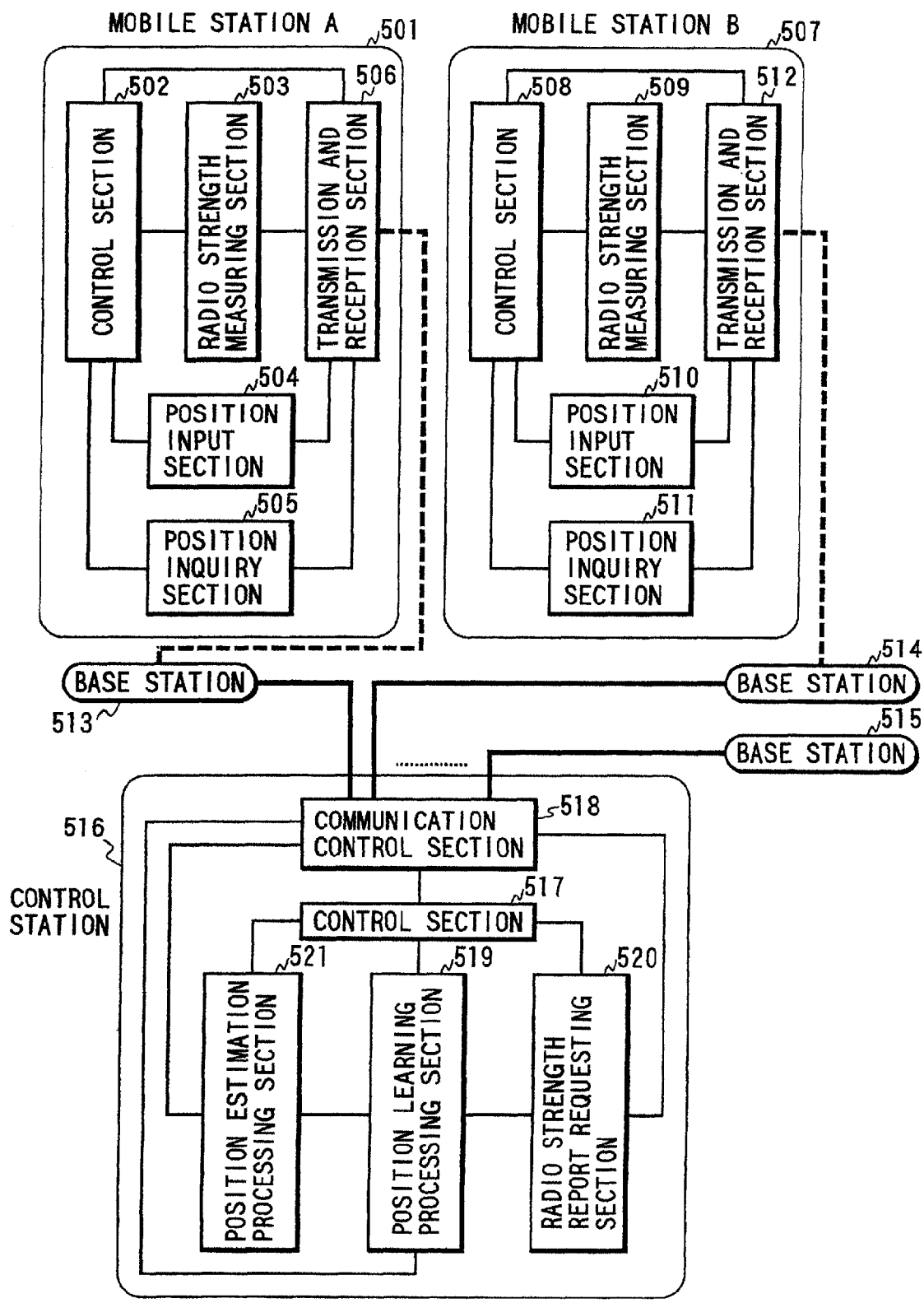
FIG. 5 is an arrangement of a radiocommunication system which adopts a position detection method according to a third embodiment of this invention.

Furthermore, a description will be taken hereinbelow of a position detection method of a radio mobile station according to a third embodiment of this invention. The third embodiment provides a radio mobile station position detection method in which the user carrying a mobile station finds, through the mobile station, its own present location or the position of a different mobile station. In a radiocommunication system adopting this detection method, as shown in FIG. 5 mobile stations A501, B507 are equipped with mobile station control sections 502, 508 for controlling the operations of the mobile stations A501, B507, radio strength measuring sections 503, 509 for measuring the radio strength levels of signals received from base stations, mobile station transmission and reception sections 506, 512 for conducting transmission and reception of signals to and from the base stations, position input sections 504, 510 for allowing the user to input learning data measuring positions, and position inquiry sections 505, 511, while a control station 516 is provided with a control station control section 517 for taking charge of the control of the operation of the control station 516, a communication control section 518 for controlling the communications with the base stations, a radio strength report requesting section 520 for making a request for the radio strength levels to the mobile stations 501, 507, a position learning processing section 519 for learning, through a neural network, the correlation between the locations of the mobiles stations 501, 507 and the reception radio strength levels at the mobile station locations and further for storing the correlation therebetween, and a position estimation processing section 521 for estimating the position of the mobile stations 501, 507 on the basis of the measured radio strength values through the use of the stored correlation. The arrangement of each of base stations 513, 514, 515 is the same as that of the base station in the first embodiment (see FIG. 1).

First, a description will be taken hereinbelow of the operation of this system in a learning mode. The user carrying the mobile station A501 inputs positional information through the position input section 504 at a learning data measuring position.

Subsequently, the mobile station control section 502 detects the input and gives instructions to the radio strength measuring section 503 to measure the receivable radio strength levels from all the base stations including the plurality of base stations 513, 514, 515 (similarly, measuring the radio strength levels from the mobile station B). After the measurements, the radio strength measuring section 503 transmits the measured reception radio strength levels from the plurality of base stations and the positional information on the measuring points through the transmission and reception section 506 to the base station 513 which caused the highest reception radio strength level, while the base station 513 communicates these data to the control station 516.

In the control station 516, the communication control section 518 receives these data, whereas the control section 517 judges the kind of data and conveys these data to the position learning processing section 519. With this process, the data for the learning of the neural network are collected in the position learning processing section 519. The operation of the position learning processing section 519 subsequently conducted is the same as those of the position learning processing sections of the radiocommunication systems according to the first and second embodiments.

Secondly, the description proceeds to an operation in an estimation mode. In this instance, let it be assumed that the user of the mobile station A501 tries to find its own position or the position of the mobile station B507 being a different mobile station. The user of the mobile station A 501 first, when wanting its own position, gives instructions therefor to the position inquiry section 505 and, when wanting the position of the other mobile station B, inputs the identification number (telephone number or the like) for the mobile station B to make an inquiry. In the case of giving instructions for the inquiry on its own position, the position inquiry section 505 asks the mobile station control section 502 to give instructions to the radio strength measuring section 503 to measure the reception radio strength levels from all the base stations. After the measurements, the radio strength measuring section 503 conveys the measurement results through the base station 513 to the control station 516.

In the control station 516, the communication control section 518 receives the measurement results and passes them to the position estimation processing section 521. The position estimation processing section 521 inputs the reception radio strength levels on the plurality of base stations reported from the mobile station A501 to the neural network which already completed the learning in the position learning processing section 519 to obtain the corresponding position coordinates. The position coordinates thus obtained are delivered to the communication control section 518 to be transmitted through the base station 513 to the mobile station 501, so that the mobile station A501 can find its own present location.

On the other hand, in the case that in the mobile station A the instructions for the position of the mobile station B, together with the identification number of the mobile station B, are given, the position inquiry section 505 gives instructions to the transmission and reception section 506 to transmit the inquiry request and the identification number of the target mobile station through the base station 513 to the control station 516. In the control station 516, the communication control section 518 receives these information and the control section 517 analyzes the reception data to make a decision to that it is an inquiry request for the position of the mobile station B and hands the data over to the radio strength report requesting section 520. When receiving the data, i.e., the identification number of the mobile station B and the inquiry request for the position thereof, the radio strength report requesting section 520 issues a radio strength report request on the mobile station B to the communication control section 518. The communication control section 518, which performs the movement managements (the functions provided in the standards for the portable telephones or PHSs) on the position registration of the mobile stations, retrieves the general calling area (an area comprising the radio zones of a plurality of base stations for the general calling, which allows the transmission to the mobile station) for the mobile station B507 and transmits the radio strength report request to the mobile station B507.

When the mobile station B507 receives the radio strength report request, the radio strength measuring section 509 measures the reception radio strength levels from all the base stations receivable and reports them through an appropriate base station to the control station 516. In response to the radio strength report from the mobile station B507, in the control station 516 the position estimation processing section 515 obtains the position of the mobile station B517 and the communication control section 518 transmits it to the mobile station A501. Thus, the mobile station A501 can find the location of the mobile station B507.

In any case, a method of displaying to the user its own or different mobile station position coordinate data is not limited, and methods are available to display the data as values and display the data in the manner of plotting them on a map image.

Fourth Embodiment

Figure 6:
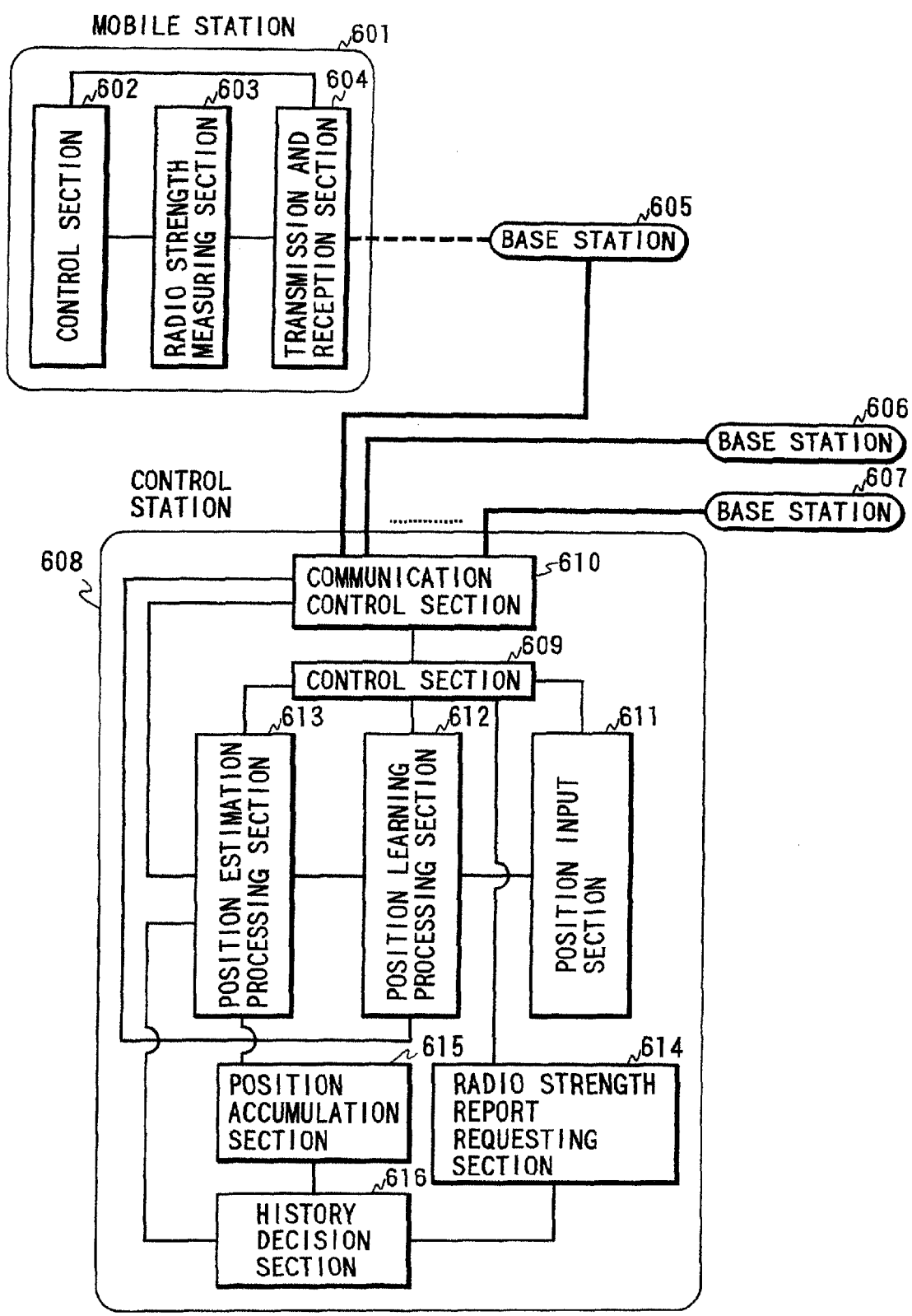
FIG. 6 is an arrangement of a radiocommunication system which follows a position detection method according to a fourth embodiment of this invention.

Furthermore, a description will be taken hereinbelow of a position detection method of a radio mobile station according to a fourth embodiment of this invention. The radio mobile station position detection method according to the fourth embodiment is for improving the accuracy of the position detection in a manner of doing the measurements over again when the estimation result shows a low reliability. In a radiocommunication system introducing this detection method, as shown in FIG. 6 a control station 608 includes a control station control section 609 for controlling the operation of the control station 608, a communication control section 610 for controlling the communication with base stations, a position input section 611 for accepting the position of a measuring point, a position learning processing section 612 for learning, through a neural network, the correlation between the position of a mobile station and reception radio strength levels at that position and further for storing the correlation therebetween, a position estimation processing section 613 for estimating the position of the mobile station on the basis of the measured radio strength levels through the use of the correlation therebetween, a radio strength report requesting section 614 for making a request for the report on the radio strength levels to the mobile station, a position accumulation section 615 for accumulating the past position coordinates of the mobile station, and a history decision section 616 for deciding, on the basis of the past positions, whether the estimated present position of the mobile station is appropriate or not. The arrangements of a mobile station 601 and each of mobile stations 605, 606, 607 are the same as those in the first embodiment (see FIG. 1).

The operation of this system in the learning mode is the same as that in the first embodiment, whereas in the estimation mode the system operates as follows. That is, in the control station 608, the position accumulation section 615 stores the position coordinates of all the mobile stations obtained by the position estimation processing section 613 in the past as time series data at every mobile station, together with the time stamp. When the mobile station 601 reports the reception radio strength levels from a plurality of base stations measured by the radio strength measuring section 603 through the base station 605 to the control station 608 in some occasion, the communication control section 610 of the control station 608 receives this report, and the control section 609 decides the kind of data and conveys it to the position estimation processing section 613.

The position estimation processing section 613 obtains the position coordinates of the mobile station 601 on the basis of the reported reception radio strength levels due to the plurality of base stations through the use of the neural network which completed the learning in the position learning processing section 612 and passes them to the history decision section 616. The history decision section 616 refers to the past position coordinates of the mobile station 616 accumulated in the position accumulation section 615 to decide whether the present position of the mobile station 610 estimated in the position estimation processing section 613 is proper or not. For the decision criterion, various ways can be taken. For example, a method is available to calculate the moving speed on the basis of the position obtained through the last estimation and the time of the estimation and the present position and the present time to decide whether or not the calculated speed is appropriate for the user carrying the mobile station or to draw the locus of the past position history to decide the appropriateness on the basis of the degree (an angle of a moving vector or the like) of the deviation in the moving direction indicated by the locus. However, this embodiment is not limited to these methods.

If appropriate, this coordinates is determined as the present position of the mobile station 601 and outputted from the position estimation processing section 613 (the destination may be a display unit of the control station, the mobile station 601, a different mobile station or the like). On the other hand, if not appropriate, the history decision section 616 gives instructions to the radio strength report requesting section 614 to issue a radio strength report request toward the mobile station 601. The radio strength report requesting section 614 transmits the radio strength report request to the mobile station 601 so that the mobile station 601 again measures the receivable radio strength levels from all the base stations and reports the measurement results. When receiving this request through the base station 605, in the mobile station 601 the radio strength measuring section 603 measures the receivable radio strength levels from all the base stations and reports the measurement results to the control station 608. In the control station 608, the position estimation processing section 613 finds the location of the mobile station 601 and the history decision section 616 judges the appropriateness of the coordinate values. If not appropriate, the above-mentioned procedure is repeated. However, in this instance, it is necessary to determine the upper limit on the number of times of repetition of the radio strength report request to the mobile station 601 in advance. In the case that the decision of no appropriateness continues, the estimation of the position resumes the limited number of times of the repetition and then stops. In this case, the position is determined in such a way that the most appropriate value is adopted or the values estimated so far are averaged.

As described above, in the position detection method according to this embodiment, in cases where, for example, a great variation of the electric field distribution in the base stations of a radiocommunication system or the learning accuracy is insufficient so that the reliability of the accuracy of position of the mobile station obtained in the position estimation processing section is expected to be low, the measurement in the mobile station resumes to repeatedly conduct the position estimation, with the result that the accuracy and reliability of the position detection can improve.

In addition, it is also appropriate that in this system a measurement interval measuring section is provided in the mobile station 601, and the radio strength measuring section 603 measures the radio strength levels from a plurality of base stations at a constant time interval measured by the measurement interval measuring section to report the measurement results through the base station to the control station 608. In this instance, since it is possible to establish the history on the position of the mobile station at the constant time interval, and hence it is possible to more accurately judge the appropriateness of the estimated position coordinates of the mobile station.

Fifth Embodiment

Still further, a description will be taken hereinbelow of a position detection method of a radio mobile station according to a fifth embodiment of this invention. This radio mobile station position detection method according to the fifth embodiment is made such that the radio strength levels measured is converted into the distance between the mobile station and the base stations and the neural network learns on the basis of the distance therebetween.

Figure 7:
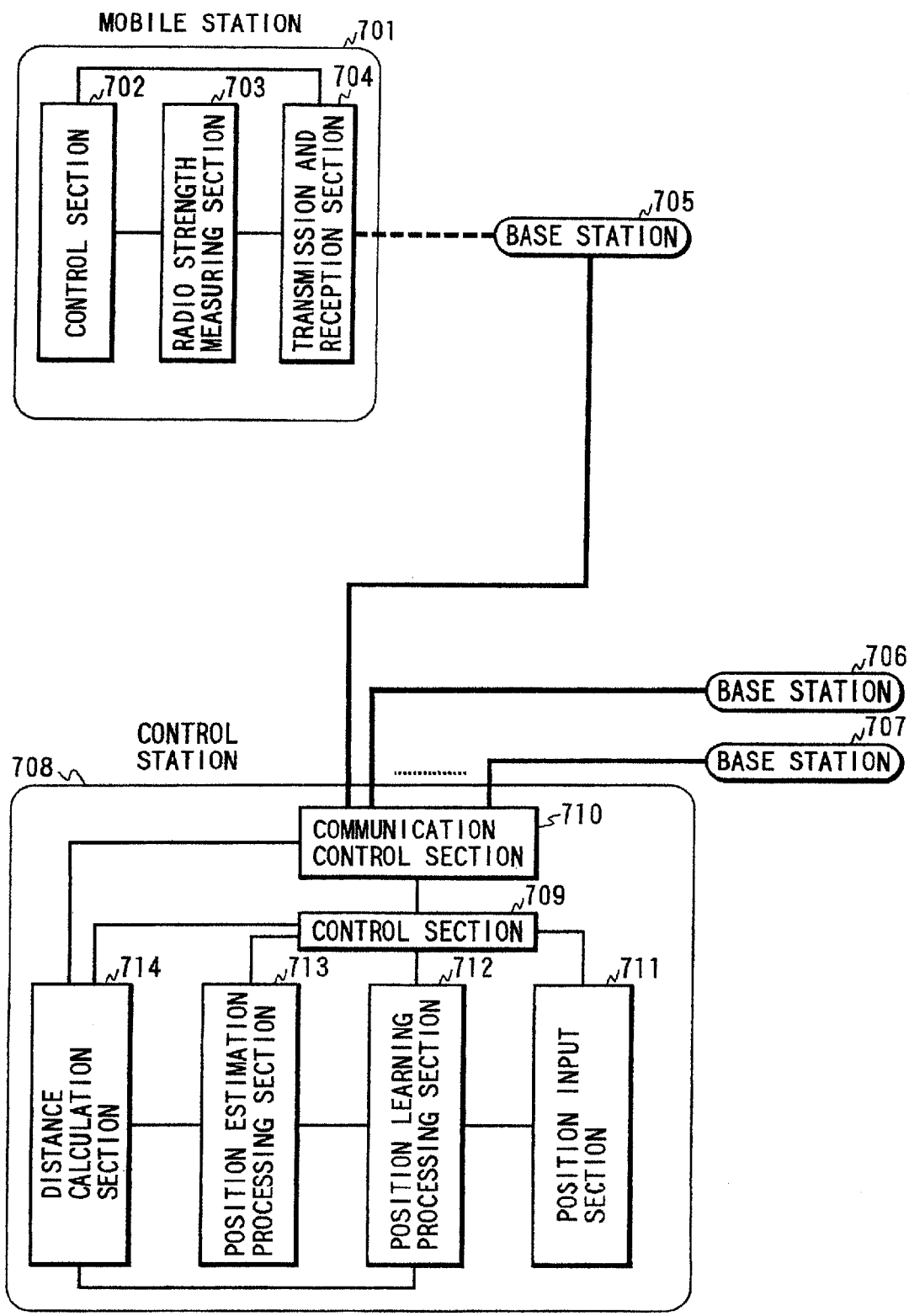
FIG. 7 is an arrangement of a radiocommunication system which adopts a position detection method according to a fifth embodiment of this invention.

In a radiocommunication system conducting this detection method, as shown in FIG. 7 a control station 708 is provided with a control station control section 709 for taking charge of the control of the control station 708, a communication control section 710 for controlling the communication with base stations, a position input section 711 for accepting the input of the positions of measuring points, a position learning processing section 712 for learning, through a neural network, the correlation between the position of a mobile station and the reception radio strength levels at that position and further for storing the correlation therebetween, a position estimation processing section 713 for estimating the position of the mobile station on the basis of the measured reception radio strength levels through the use of the correlation therebetween, and a distance calculation section 714 for theoretically calculating the distance between the mobile station and the base stations. In this system, the arrangements of a mobile station 701 and each of base stations 705, 706, 707 are the same as those in the first embodiment (see FIG. 1).

In this system, the distance calculation section 714 of the control station 708 stores a theoretical radio distance characteristic (this signifies the relationship between the distance from the base station and the radio strength level therefrom and under an ideal condition the radio strength attenuates in inverse proportion to the square of distance therefrom) of the base station and calculates the theoretical distances between the mobile station 701 and the plurality of base stations 705, 706, 707 on the basis of the reception radio strength levels due to the base stations 705, 706, 707 reported from the mobile station 701 through the use of the stored radio distance characteristic. Further, the distance calculation section 714 outputs the distance to the position learning processing section 712 in the learning mode and outputs it to the position estimation processing section 713 in the estimation mode (if the theoretical distance coincides with the actual distance, the specification of the position of the mobile station is possible with only a geometric calculation. However, in fact they hardly coincide with each other because of the influence from the reflection waves or noises. Thus, the position learning processing section 712 is required to learn the deviation from the theoretical distance).

In the learning mode, the position learning processing section 712 learns, through a neural network, the correlation between the theoretical distance from the mobile station 701 to each of the base stations, conveyed from the distance calculation section 714, and the learning measuring point position coordinates of the mobile station 701 inputted through the position input section 711 as well as the first embodiment and communicates the connection weights of the neural network being the learning results to the position estimation processing section 713 which in turn, stores them. On the other hand, in the estimation mode, the position estimation processing section 713 inputs the theoretical distance from each of the base stations to the mobile station 701 conveyed from the distance calculation section 714 to a network constructed using the connection weights undergoing the learning to obtain the position coordinates of the mobile station 701 as an output. Thus, the theoretical knowledge is introduced for the learning in the position learning processing section 713, and as compared with the first embodiment, the learning processing conducted through the neural network becomes easier and the learning accuracy more improves.

As described before, in the mobile station position detection method according to this embodiment, the theoretical distance between the mobile station and each of the base stations is calculated as a function of the reception radio strength levels from the plurality of base stations measured in the mobile station, and the correlation between the theoretical distance and the position of the mobile station is learned through the neural network, thus estimating the position of the mobile station through the use of the correlation. With this operation, the position estimation with a higher accuracy is possible as compared with the first embodiment.

Furthermore, the embodiments described above can appropriately accept the changes. For example, in cases where the mobile station outputs the measurement results on the reception radio strength levels, it is also appropriate that the measurement is made plural times at the same point so that the single value obtained through the statistical processing of the measurement values is outputted as the final measurement value. This statistical processing permits the sharp improvement of the measurement accuracy. Still further, it is also possible that two frequency synthesizers are provided in the mobile station so that, even if one of the frequency synthesizers is in the synchronized condition during a call, the measurement of the radio strength levels from a plurality of base stations is possible through the use of the other frequency synthesizer.

In addition, it is also possible that the mobile station sends the measurement results on the reception radio strength levels to the control station at a constant time interval for the measurements by the measurement interval measuring section so that the control station periodically detects and manages the position of the mobile station on the basis of the measurement results. A similar system can also be realized in such a manner that the radio strength report requesting section of the control station periodically requests for the report on the reception radio strength levels from the mobile station. These systems allow the position accumulation section of the control station to be usable for the position management of the mobile station.

Sixth Embodiment

Figure 8:
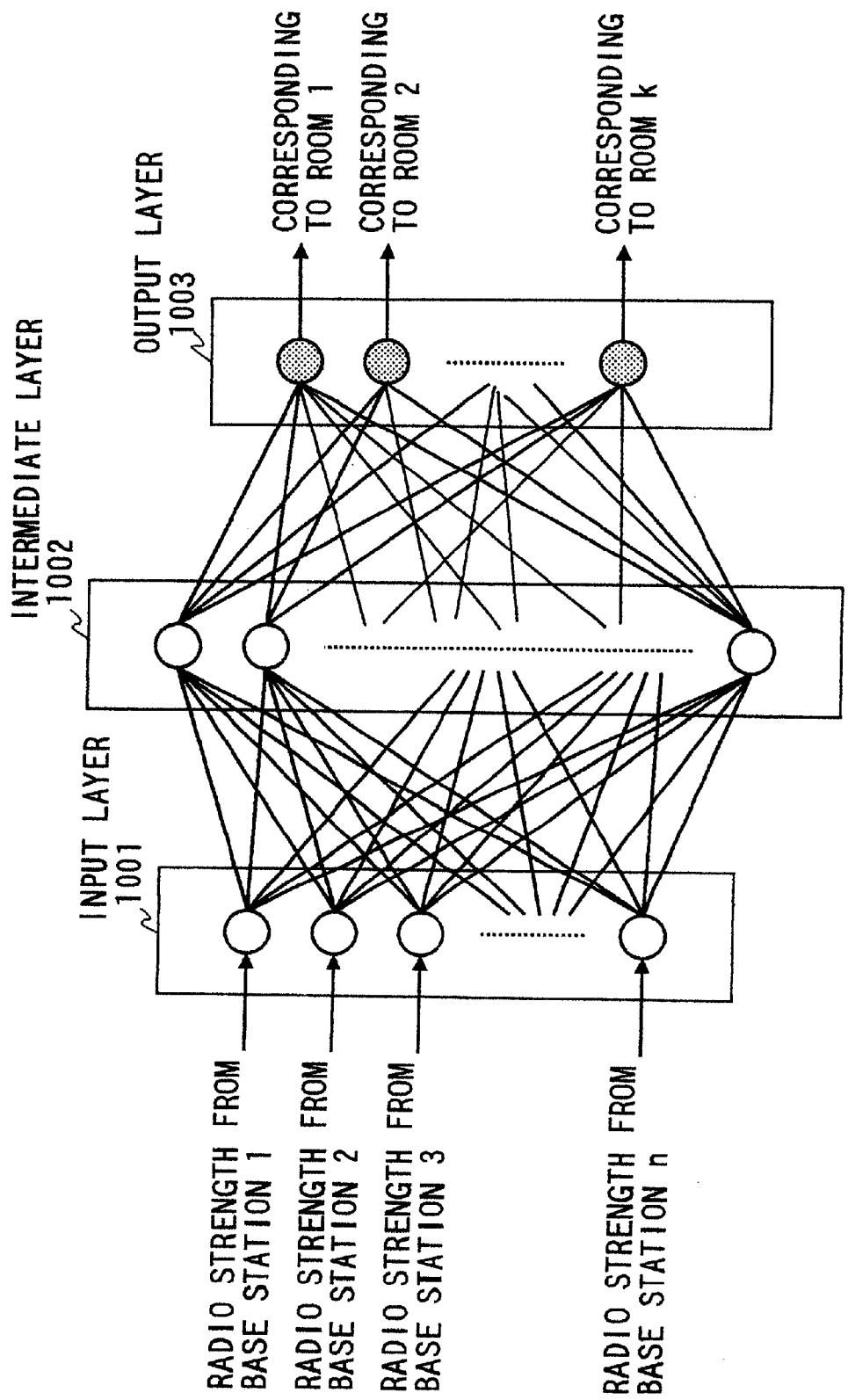
FIG. 8 is an arrangement of a radiocommunication system for a position detection method according to a sixth embodiment of this invention.

Furthermore, a description will be made hereinbelow of a position detection method according to a sixth embodiment of this invention. The detection method according to the sixth embodiment is designed to detect an area with an expansion, such as a room or district a radio mobile station exists. According to this detection method, a position learning processing section of a control station constructs a neural network as shown in FIG. 8. In FIG. 8, numeral 1001 represents an input layer, 1002 designates an intermediate layer, and numeral 1003 stands for an output layer, and the difference from the neural network (see FIG. 3) in the first embodiment is the output layer 1003. In this embodiment, the position of the mobile station is expressed with the name or symbol of a place representative of that address, for example, a room name or room number in the case of an indoor place and a dwelling, place number or the like in the outdoor place. The number of nodes of the output layer 1003 is set to coincide with the number of spots (the number of rooms, the number of districts in the same dwelling, or the like) included in the area being an object under position detection, and the neural network is constructed so that the respective nodes of the output layer 1003 are in one-to-one correspondence relation to the respective spots. FIG. 8 shows the case that each of the nodes of the output layer 1003 corresponds to a room.

Each of the output values of the output layer can assume a continuous value within a constant range such as 0 to 1 or assume any one of two predetermined values such as 0 or 1. This output configuration depends upon the selection way of the input and output function of the output layer nodes. If the sigmoid function ($f(x)=1/\{1+\exp(-\alpha x)\}$, $\alpha$: constant) is used as the input and output function, the output configuration is expressed with the former format. On the other hand, if the threshold function (when $x<\theta$, $f(x)=0$, when $x \geq \theta$, $f(x)=1$, $\theta$: a constant) or the like is employed, it is expressed with the latter format. The following description will be made in terms of the case that the output configuration is expressed with the former format.

First, in the learning mode, in the neural network thus constructed, when the electric field strength levels from a plurality of base stations measured by a mobile station at a predetermined measuring point are inputted into the nodes of the input layer respectively corresponding to the base stations, the learning is made such that the node of the output layer corresponding to the spot (a room, a district or the like) including that measuring point outputs 1 and the other nodes of the same output layer output 0. In this instance, in one place a plurality of measuring points can also be set in accordance with its extent. Further, if the place is relatively small, one measuring point can represent that place (or the average of the measurement values at a plurality of measuring points set can be used for the learning). On the other hand, if the region is wide, it is preferable that a plurality of measuring points are set to uniformly exist within the region.

At this time, unlike the neural network which outputs the coordinate values from its output layer, a severe strictness in the specification of the measuring points is not necessary as long as exiting within the region.

Secondly, in the estimation mode, when the mobile station inputs the radio strength levels from a plurality of base stations it measures, to the neural network which completed the learning, the respective nodes of the output layer 1003 output values between 0 to 1. If the position of the mobile station is specified to one place, the place, i.e., a room or district, corresponding to one node from which a value closest to 1 is outputted is detected as the position of the mobile station. Further, in cases where the specification of the place is unnecessary and it is satisfied to show several candidates for the places, it is also possible to show a plurality of places corresponding to a plurality of nodes whose outputs are relatively large (close to 1). Moreover, since there is a correlation between the magnitude of the output value and the probability of the actual existence of the mobile station at the place corresponding to that node, it is possible to present the position detection result as a existence probability to express the degree of the probability that the mobile station exists at some place.

As described above, in the position detection method according to this embodiment, the respective nodes of the output layer of the neural network are made corresponding to the places, with the result that the position detection of the mobile station can be done in units of regions with an extension, such as a room or a district. This position detection method can be employed for the systems in the above-described embodiments, and the operations other than the above description will be made according to the operations taken in the embodiments.

Seventh Embodiment

Figure 9:
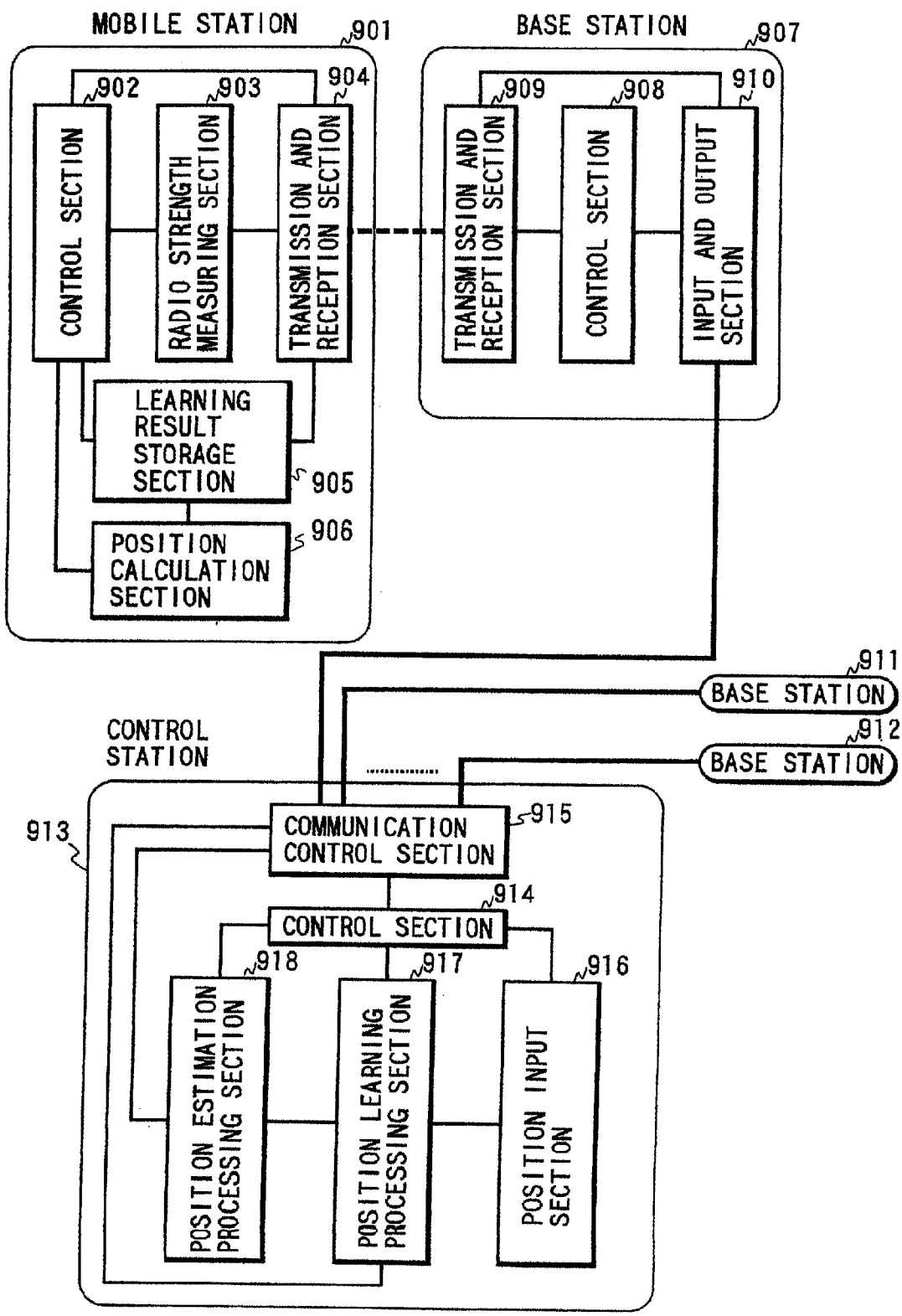
FIG. 9 is an arrangement of a radiocommunication system which introduces a position detection method according to a seventh embodiment of this invention.

Moreover, a description will be made hereinbelow of a radio mobile station position detection method according to a seventh embodiment of this invention. The position detection method according to this embodiment allows that a mobile station finds its own present position through its internal processing. In a radiocommunication system based upon this detection method, as shown in FIG. 9 a mobile station 901 comprises a mobile station control section 902 for taking charge of the control of the operation of the mobile station 901, a radio strength measuring section 903 for measuring the radio strength levels from base stations, a mobile station transmission and reception section 904 for carrying out the transmission and reception of a signal to and from a base station 907, a learning result storage section 905 for storing parameters of a learning-completed neural network transmitted from a control station 913, and a position calculation section 906 for constructing a neural network using the parameters stored in the learning result storage section 905 to calculate its own position. The arrangements of base stations 907, 911, 912 and the control station 913 are the same as those in the first embodiment (see FIG. 1).

Secondly, a description will be taken hereinbelow of the operation of this system. A position learning processing section 917 of the control station 913 learns, through a neural network, the correlation between the reception radio strength levels due to a plurality of base stations measured by the mobile station 901 at a plurality of measuring points and the positions of the measuring points. The processes up to this are the same as those in the first embodiment. The parameters, i.e., the weights on connections between the nodes and others, expressing the neural network which completed the learning in the position learning processing section 917 of the control station 913 are transferred through some means to the mobile station 901 and stored in the learning result storage section 905 of the mobile station 901.

As a method to transfer the parameter data expressing the learning-completed neural network, there is an on-line method in which the data is radio-transmitted through the base station 907 to the mobile station 901 through the use of a communication line of the radio communication system to to be communicated to the learning result storage section 905 or an off-line method in which, in the case that the mobile station 901 is equipped with an interface made with a recording medium interface such as a CDROM, a floppy disc and an IC card (for example, a portable information terminal with a communication function or a notebook-size personal computer incorporating a radio communication modem), the parameter data is once stored in the recording medium which in turn, is given to the user who uses the mobile station 901 so that the parameter data is taken out from the recording medium to the learning result storage section 905 of the mobile station 901. However, the parameter transferring method in this embodiment is not limited to these methods.

When the user carrying the mobile station 901 gives instructions through some input means (a command due to a button, or the like) to the mobile station control section 902 for the request for the detection of its own position, the mobile station control section 902 gives instructions to the radio strength measuring section 903 to measure the receivable radio strength levels from all the base stations, and hence the radio strength measuring section 903 conveys the measurement results to the position calculation section 906 according to the instructions. The position calculation section 906 constructs a neural network by using the data stored in the learning result storage section 905 and inputs the measurement results conveyed from the radio strength measuring section 903 to the neural network to obtain the position of the mobile station 901.

Thus, in this system according to this embodiment, the learning result obtained in the position learning processing section of the control station is held in the mobile station in advance, and in the case that the user carrying the mobile station wants to know his own position, his own position is detectable through the internal processing of the mobile station without the inquiry to the control station through the communication each time.

Eighth Embodiment

Figure 10:
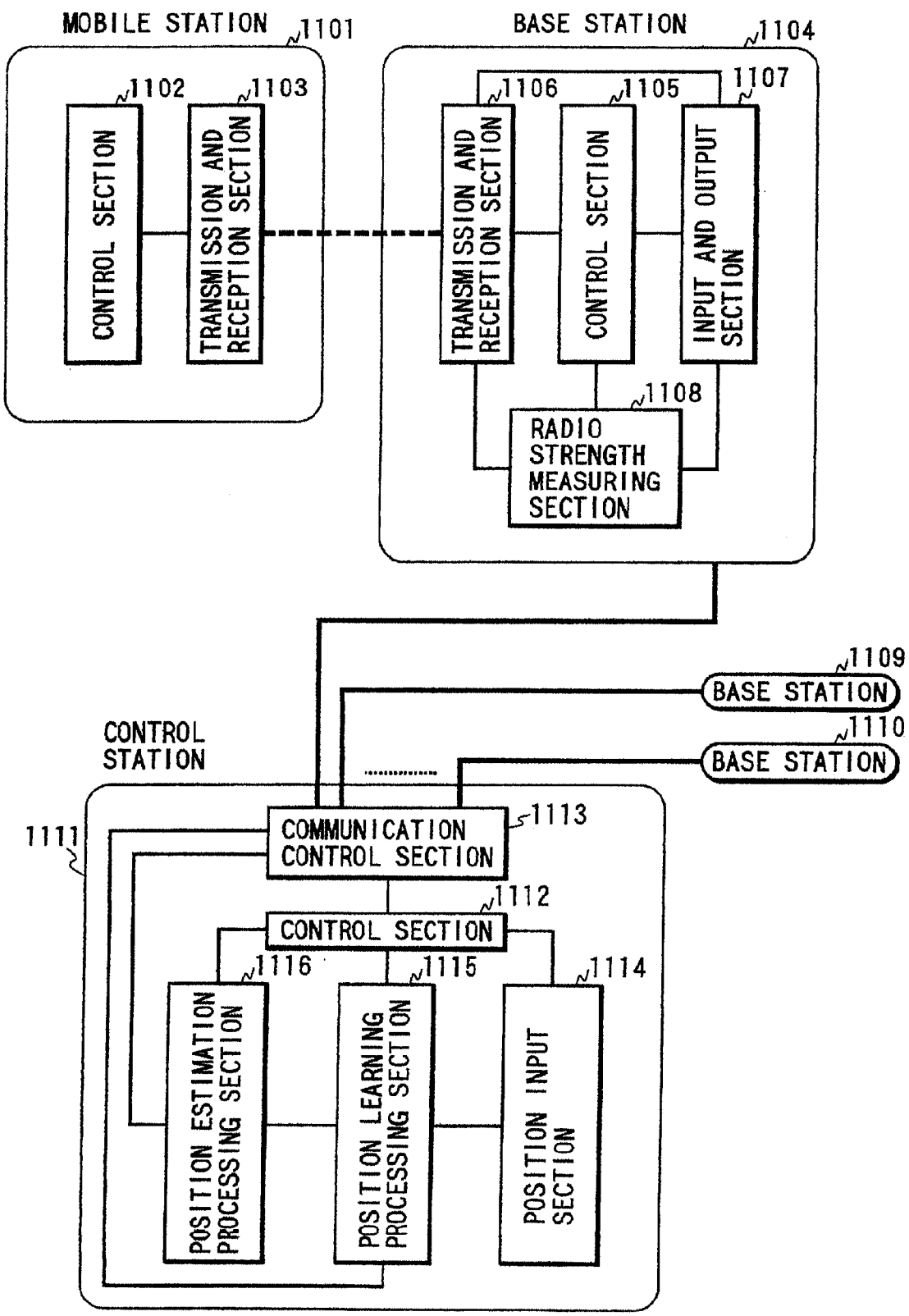
FIG. 10 is an arrangement of a radiocommunication system based upon a position detection method according to an eighth embodiment of this invention.

Furthermore, a description will be made hereinbelow of a position detection method according to an eighth embodiment of this invention. the position detection method according to this embodiment is made such that a plurality of base stations measure the radio wave emitted from a mobile station to detect the position of the mobile station on the basis of the measurement results. In a radiocommunication system adopting this detection method, as shown in FIG. 10, a mobile station 1101 comprises a mobile station control section 1102 for controlling the operation of the mobile station 1101 and a mobile station transmission and reception section 1103 and a base station 1104 comprises a base station control section 1105 for controlling the operation of the base station 1104, a base station transmission and reception section 1106 for carrying out the transmission and reception of a signal to and from the mobile station 1101, a base station input and output section 1107 for performing the transmission and reception of a signal through a wire circuit to and from a control station 1111, and a radio strength measuring section 1 108 for measuring the radio strength level of a signal from the mobile station. The arrangement of the control station 1111 is the same as that in the first embodiment (see FIG. 1).

Secondly, a description will be made hereinbelow of the operation of this system. In the learning mode of this system, the mobile station 1101 issues a radio wave (an upstream control signal such as a calling response signal and a calling signal) at a point set in advance, while the base station 1104 receives this radio wave and the radio strength measuring section 1108 of the base station 1104 measures the radio strength level and reports the measurement result through the base station input and output section 1107 to the control station 1111. At this time, in a similar way the other base stations 1109, 1110 receive and measure the same radio wave emitted from the mobile station 1101 and report the measurement results to the control station 1111. That is, the measurement of the strength of the radio wave emitted from the mobile station are done at a plurality of points set in advance.

In the control station 1111, a communication control section 1113 receives the electric field strength data related to the mobile station 1101 reported from the respective base stations and passes, the data to a position learning processing section 1115. The position learning processing section 1115 once stores these data and constructs a neural neural network which receives, through its input layer nodes, the measurement results of the respective base stations with respect to the radio wave from the mobile station 1101 and outputs the position of the mobile station 1101 at that time. Further, the position learning processing section 1115 learns the correlation between the reception radio strength levels on the radio wave from the mobile station 1101, measured by the plurality of base stations, and the position of the mobile station 1101 at the measuring time. (The positional information on a plurality of measuring points set in advance is inputted through a position input section 1114 into the position learning processing section 1115 as well as the first embodiment, and the corresponding relationship between the measurement result data at the base stations and the positional information is established in the same way as in the first embodiment.)

On the other hand, in the estimation mode, the base stations 1104, 1109, 1110 receive and measure any radio signal (control signal) emitted from the mobile station 1101 at an arbitrary point and report the measurement results to the control station 1111. In the control station 1111, the communication control section 1113 receives the electric field strength data of the radio wave from the mobile station 1101, reported from the respective base stations, and hands them over to a position estimation processing section 1116. The position estimation processing section 1116 once collects these electric field strength data and inputs these electric field strength data to the neural network which completed the learning in the position learning processing section 1115, thus obtaining the position of the mobile station 1101 as its output. Thus, in the system according to this embodiment can detect the position of the mobile station in a manner that the plurality of base stations measure the radio wave emitted from the mobile station.

In a radiocommunication system for land mobile radiotelephones, a plurality of base stations measure the radio wave emitted from a mobile station at the time of determining the existence area of the mobile station to specify as the existence area the radio zone of a base station which shows the highest radio strength level, and the system according to this embodiment can exhibit the compatibility with a radiocommunication system based upon such a way and particularly effective thereto.

Although in the above description a plurality of base stations measure the radio wave emitted from the mobile station and the reception radio strength levels measured are directly inputted to the neural network, in order to eliminate the detection error resulting from the variation of the strength of the transmission radio wave from the mobile station, it is also appropriate that the ratio of the reception radio strength levels measured by the respective base stations is used as the input value to the neural network. Further, although for the description only the same mobile station 1101 is used in the learning mode and the estimation mode, in fact there is no need to use the same mobile station in both the modes, as well as the first embodiment.

As obvious from the above description, with the radio mobile station position detection methods according to this invention, the data on the measuring points are used for the learning to obtain the position of the mobile station. Accordingly, these method can remove the need for previously drawing the electric field strength map at every base station and further allows the position detection of the mobile station only in such a manner that the reception radio strength levels in the mobile station at several measuring points are measured in advance. Besides, even if the variation of the electric field strength occurs, it is possible to quickly cope with this variation. Further, in the position detection method where the positions of the measuring points are determined in advance, the position input of the measuring points necessary for the learning becomes easy. Still further, with the position detection method in which the positions of the chargers are set as the measuring points, the reception radio strength measurement is possible during the charging of the mobile stations, and hence it is possible to automatically collect the reception radio strength data related to a plurality of base stations for the learning, and since the positions of the chargers are the measuring points, the position input of the measuring points becomes easy.

Furthermore, according to the position detection method in which the positional data of the measuring points are inputted from the mobile station, the reception radio strength level at an arbitrary position can be used as the learning data without fixing the measuring points in advance. In addition, with the position detection method in which the value obtained after the statistical processing of the plural measurement results is outputted as a measurement value, even if the the measurement error of the reception radio strength due to the occurrence of noises or the like greatly occurs, the position detection can improve in accuracy. Further, in the mobile station, it is possible to find its own present position or the present position of a person carrying a different mobile station. Still further, with the position detection method made to store the position history of the mobile station, the appropriateness of the presently detected position is judged using the position history, with the result that the reliability of the position detection can improve.

Moreover, with the position detection method in which the mobile station periodically reports the measurement result of the reception radio strength levels to the control station at a constant time interval, it is possible to construct a system which detects the position of the mobile station at a regular interval and manages the position thereof In addition, according to the position detection method where the reception radio strength is converted into a theoretical distance for the learning, not only the learning accuracy in the neural network can heighten but also the position estimation accuracy can improve. Further, with the position detection method in which the result of the position detection is shown with an area with an expansion such as a room and a district, in the case of being applied to the management of the whereabouts of persons carrying a mobile station in the indoor place, the detection result can be indicated to be easier to understand as compared with the numeric coordinates. In addition, it is also possible to present a plurality of places as the candidates for the whereabouts, whereby the position detection with a higher reliability is possible as compared with the presentation of a specific position.

Furthermore, with the position detection method in which the learning-completed neural network is held in the interior of the mobile station, since the mobile station can implement the detection, processing of its own position, there is no need for the inquiry through communications to the control station, with the result that the communication resource is savable and the response necessary until obtaining the detection result becomes shortened. Particularly, in the case that a radiocommunication system to which the position detection method according to this invention is applied is constructed using a public wireless network, the communication charge imposed on the user at the position detection becomes unnecessary. Moreover, the position detection where a plurality of base stations measures the radio wave from a mobile station so that the position of the mobile station is detected on the basis of the measurement results is applicable to a radiocommunication system such as a land mobile radiotelephone which has a mechanism that a plurality of base stations measures the radio wave from a mobile station. The position of a motor vehicle or the like is detectable on the basis of the measurement results of a plurality of base stations.

In addition, the wireless radiocommunication system according to this invention can conduct the above-mentioned position detection methods. In the wireless radiocommunication system including a learning data collector, it is possible to collect the learning data in a fixed point observation way and in a continuous way, and even if the system is in an operating condition, the learning accuracy can improve and the position detection accuracy can heighten. Further, in the system having a control station equipped with a radio strength report requesting means, the control station issues a radio strength report request to a mobile station so that the mobile station measures the reception radio strength levels from a plurality of base stations and reports the measurement results, with the result that the present position of the mobile station at an arbitrary time can be found in response to the request from the control station side. Moreover, in the system having a mobile station provided with a plurality of synthesizers, the measurement of the reception radio strength levels for the learning and the position estimation is done even during the conversation, so that the learning and the estimation of the position become possible even during the call.

Ninth Embodiment

Figure 11:
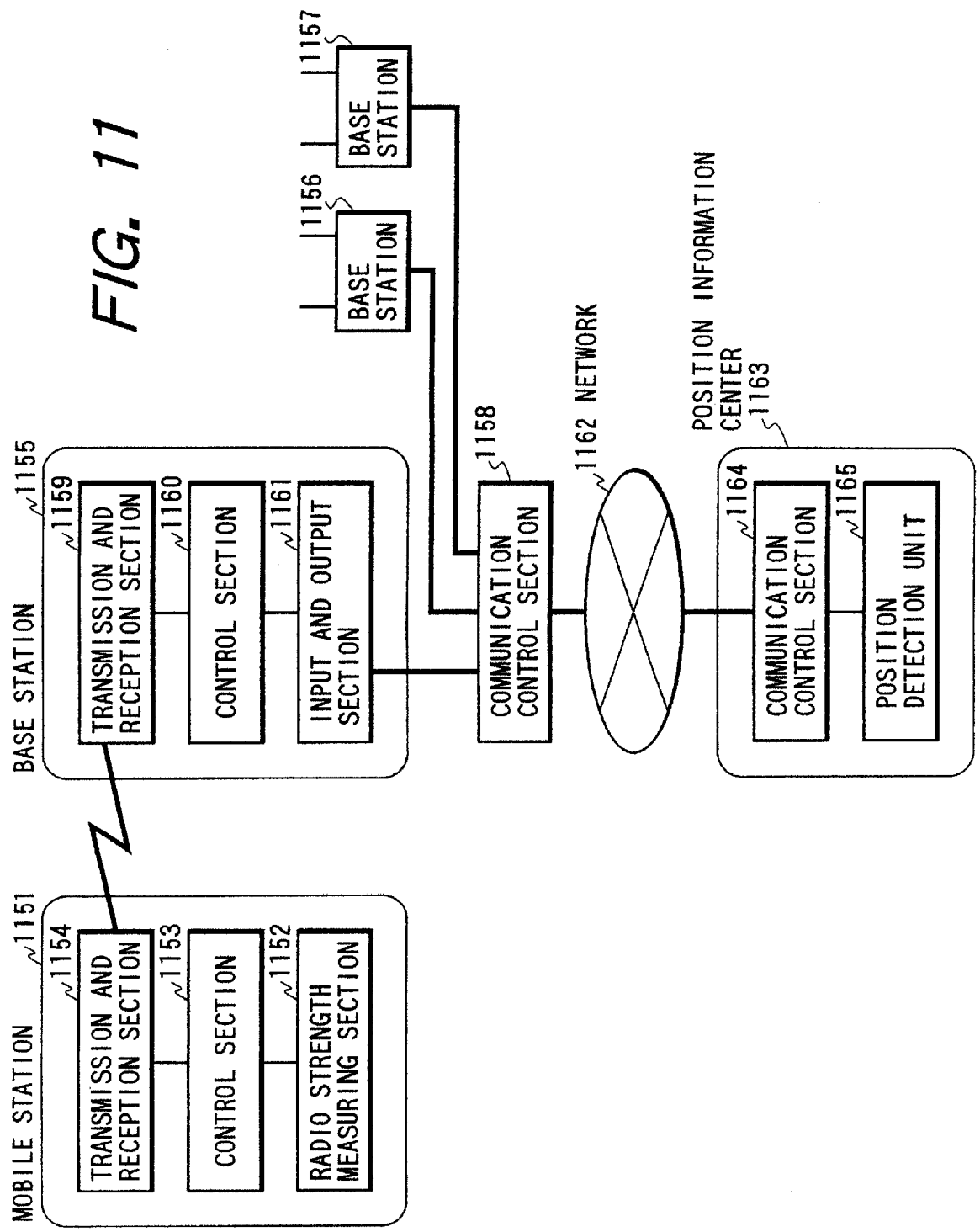
FIG. 11 is a block diagram showing an arrangement of a radiocommunication system based upon a position detection method according to a ninth embodiment of this invention.
Figure 12:
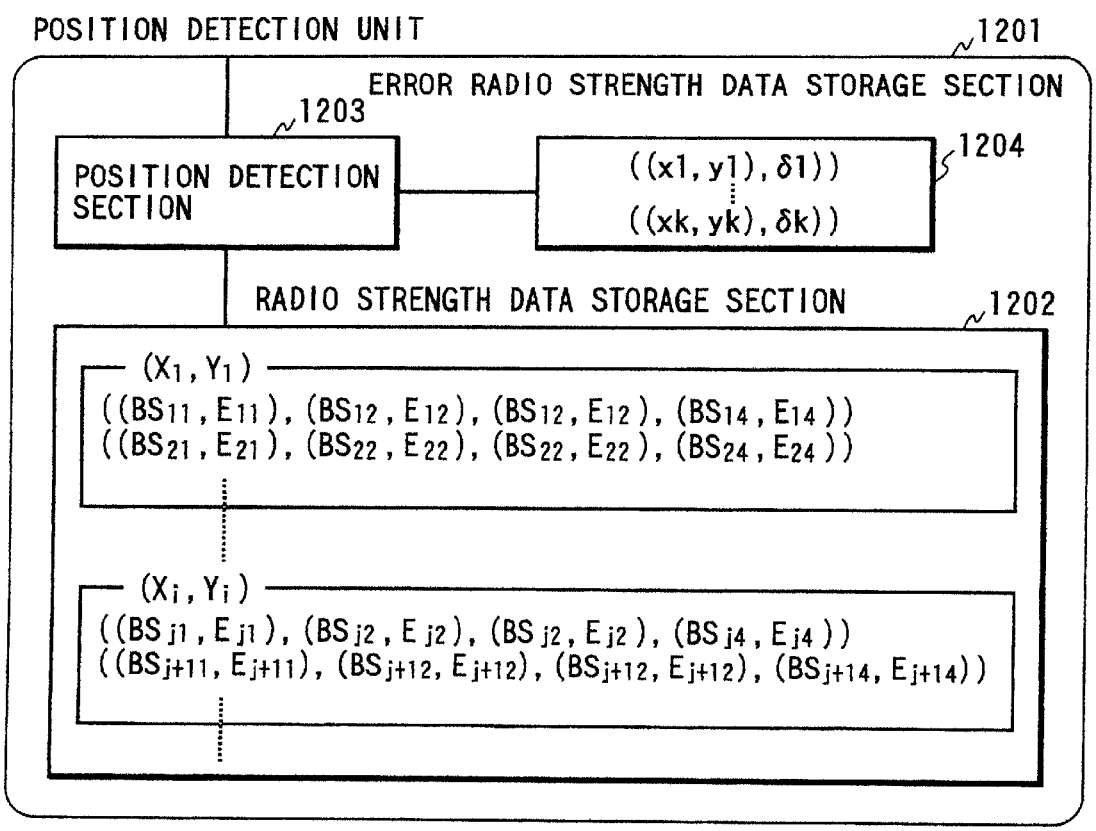
FIG. 12 is a block diagram showing an arrangement of a position detection system in a radiocommunication system adopting the position detection method according to the ninth embodiment.
Figure 13:
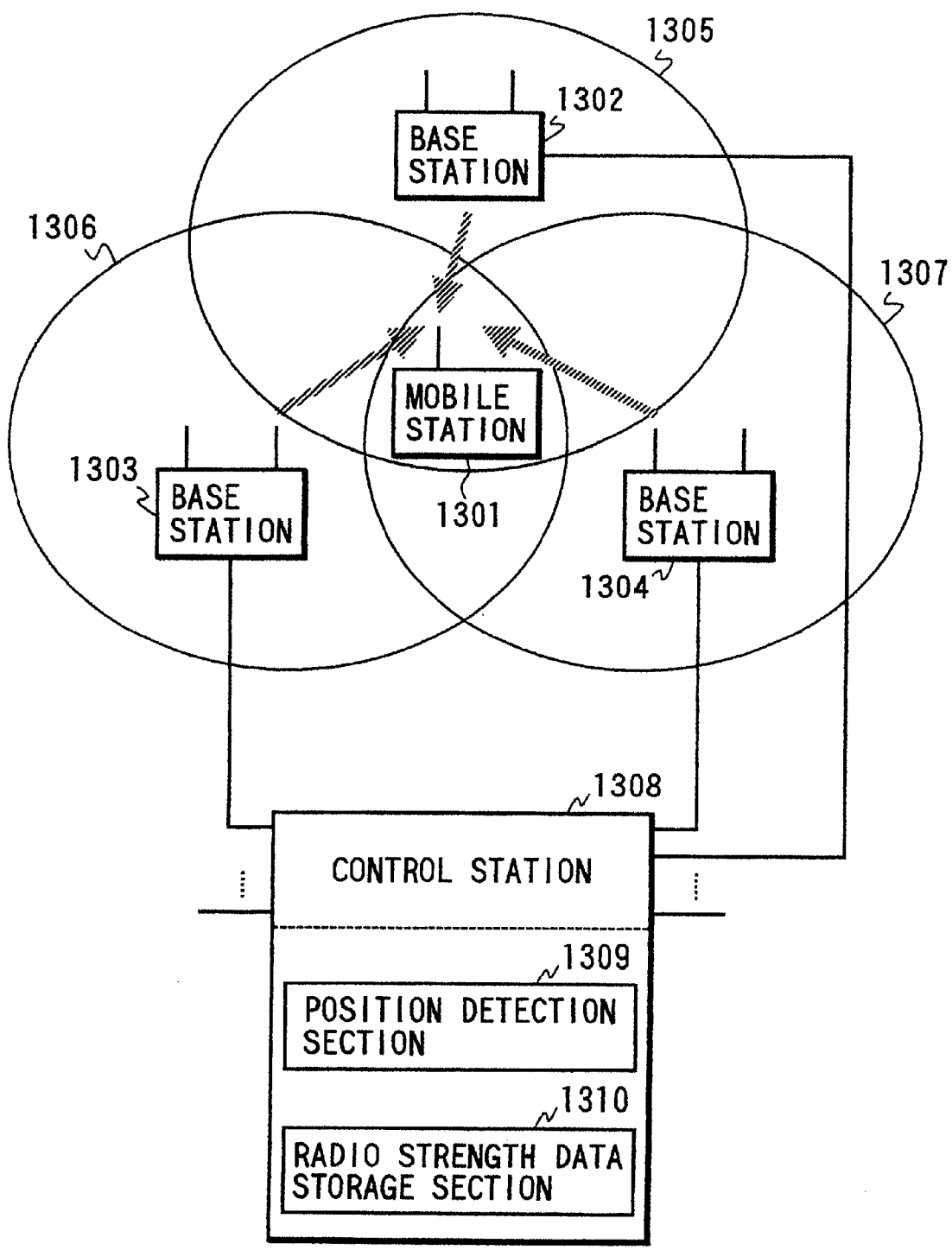
FIG. 13 is an illustration of an image of a radiocommunication system based upon the position detection method according to the ninth embodiment.

Still further, a description will be made hereinbelow of an operation of a radiocommunication system based upon a detection method (or system) of a position of a radio mobile station according to a ninth embodiment of this invention. FIG. 11 is a block diagram schematically showing an arrangement of a radiocommunication system adopting a position detection method according to the ninth embodiment, FIG. 12 is an illustration of an example of an arrangement of a position detection unit in FIG. 11, and FIG. 13 shows an image of this system. In FIG. 11, numeral 1151 represents a mobile station, numeral 1152 designates a radio strength measuring section for measuring radio strength levels from a base station, numeral 1153 denotes a control section for issuing measurement instructions to the radio strength measuring section 1152 and further for controlling radiocommunications, numeral 1154 depicts a mobile station transmission and reception section for taking charge of transmission and reception in radiocommunications, numerals 1155, 1156, 1157 stand for base stations, numeral 1158 indicates a communication control section for controlling communication with the plurality of base stations 1155, 1156, 1157, numeral 1159 signifies a transmission and reception section for transmission and reception in radiocommunications, numeral 1160 represents a control section for controlling communications between the mobile station 1151 and the communication control section 1158, numeral 1161 designates an input and output section for communications with the communication control section 1158, numeral 1162 denotes a network, numeral 1163 depicts a position information center, numeral 1164 signifies a communication control section for performing transmission and reception to and from the network 1162 to control a position detection processing, and numeral 1165 stands for a position detection unit for detecting a position controlled through the communication control section 1164.

Furthermore, in FIG. 12, numeral 1201 represents the position detection unit in FIG. 11, numeral 1202 designates a radio strength data storage section for retaining position information expressible with continuous values and obtained at a plurality of measuring points and radio strength data comprising reception radio strength levels from a plurality of base stations obtained in a mobile station, numeral 1203 denotes a position detection section for comparing the radio strength data in the radio strength data storage section 1202 with radio strength levels at a position detecting point to estimate the position of the mobile station, and numeral 1204 signifies an error radio strength data storage section for holding a plurality of radio strength data not involving a large error. Still further, in FIG. 13, numeral 1301 represents a mobile station, numerals 1302, 1303, 1304 designate base stations, numerals 1305, 1306, 1307 denote radio zones of the respective base stations 1302, 1303, 1304, numeral 1308 denotes a control station, numeral 1303 depicts a position detection section, and numeral 1310 stands for a radio strength data storage section.

In a radiocommunication system according to this embodiment, in cases where as shown in FIG. 13 the mobile station 1301 simultaneously stands within the respective radio zones 1305, 1306, 1307 of the plurality of base stations 1302, 1303, 1304, the position detection section 1309 and the radio strength data storage section 1310 of the control station 1308 detect the position of the mobile station 1301 on the basis of the strength levels of radio signals of the base stations 1302, 1303, 1304 measured by the mobile station 1301. The operation of the radiocommunication system according to this embodiment is divided into a preparation for inputting the positional information of a plurality of measuring points within a service area and the radio strength data comprising reception radio strength levels from a plurality of base stations into the radio strength data storage section 1202 in advance and a detection process for estimating the position of a mobile station on the basis of the stored radio strength data. As the way to input the data in the preparation, methods are available to communicate and input the reception radio strength levels from a plurality of base stations measured by a mobile station, together with the positional information, in real time or to together input the reception radio strength data from base stations measured in an online way through a wire connection. However, in this instance, the radio strength data is already inputted into radio strength data storage section, and the description of the inputting way is omitted for brevity.

Figure 14A:
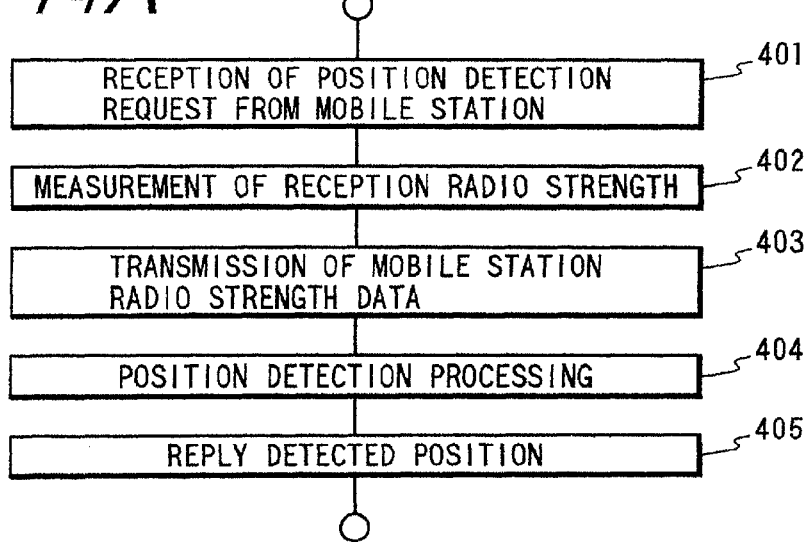
FIG. 14A is a flow chart showing a position detection process in a radiocommunication system adopting the position detection method according to the ninth embodiment.

Referring to a flow chart of FIG. 14A, a description will be made hereinbelow of an operation taken until the present position of a mobile station is estimated after the mobile station issues a position detection request. The control section 1153 of the mobile station 1151 waits for a position detection request (step 401), the position detection request being arbitrarily made at a timing according to an input command from the user at an arbitrary point, at a timing on a system operation or at a constant time interval. In response to the position detection request, the control section 1153 gives instructions for radio strength measurement, and the radio strength measuring section 1152 measures the radio strength levels from or due to a plurality of base stations (step 402). Because the radio strength is unstable due to the presence of the external factors such as the fading caused by the multi-pass and the environmental variations, for the measurement thereof, there are employed various ways based upon statistical processing, for example, the measurement of the radio strength is conducted at a given time interval or plural times so that the measurement results, are averaged, the weighted mean thereof is calculated or the maximum value thereof is taken. The description of the radio strength measuring way in this embodiment will be omitted here.

After the measurement of the radio strength levels from the plurality of base stations, the control section 1153 selects, for example, the base station 1153 producing the maximum radio strength level and transmits the reception radio strength data through the mobile station transmission and reception section 1154 to the base station 1153. In the base station 1155, the base station transmission and reception section 1159 receives the reception radio strength data from the mobile station 1151 and the base station control section 1160 judges the kind of data and then sends the reception radio strength data through the input and output section 1161, the communication control section 1158 and the network 1162 to the position information center 1163 (step 403). As the reception radio strength data to be transmitted here, there are the radio strength levels from all the base stations the mobile station can receive, the radio strength levels from all the base stations which exceeds a given value, and the radio strength levels from a specified number of base stations which are taken in the order of decreasing strength. For the illustration only, the description will be made of an example of reporting the higher four base station radio strength levels.

When receiving the reception radio strength data, the position information center 1163 passes the reception radio strength data to the communication control section 1164 and the communication control section 1164 then conveys it to the position detection unit 1165 to estimate the position of the mobile station 1151 to obtain the estimation result (step 404). The estimation result obtained in the position detection unit 1165 returns through the network 1162, the communication control section 1158 and the base station 1155; to the mobile station 1151 (step 405).

Figure 14B:
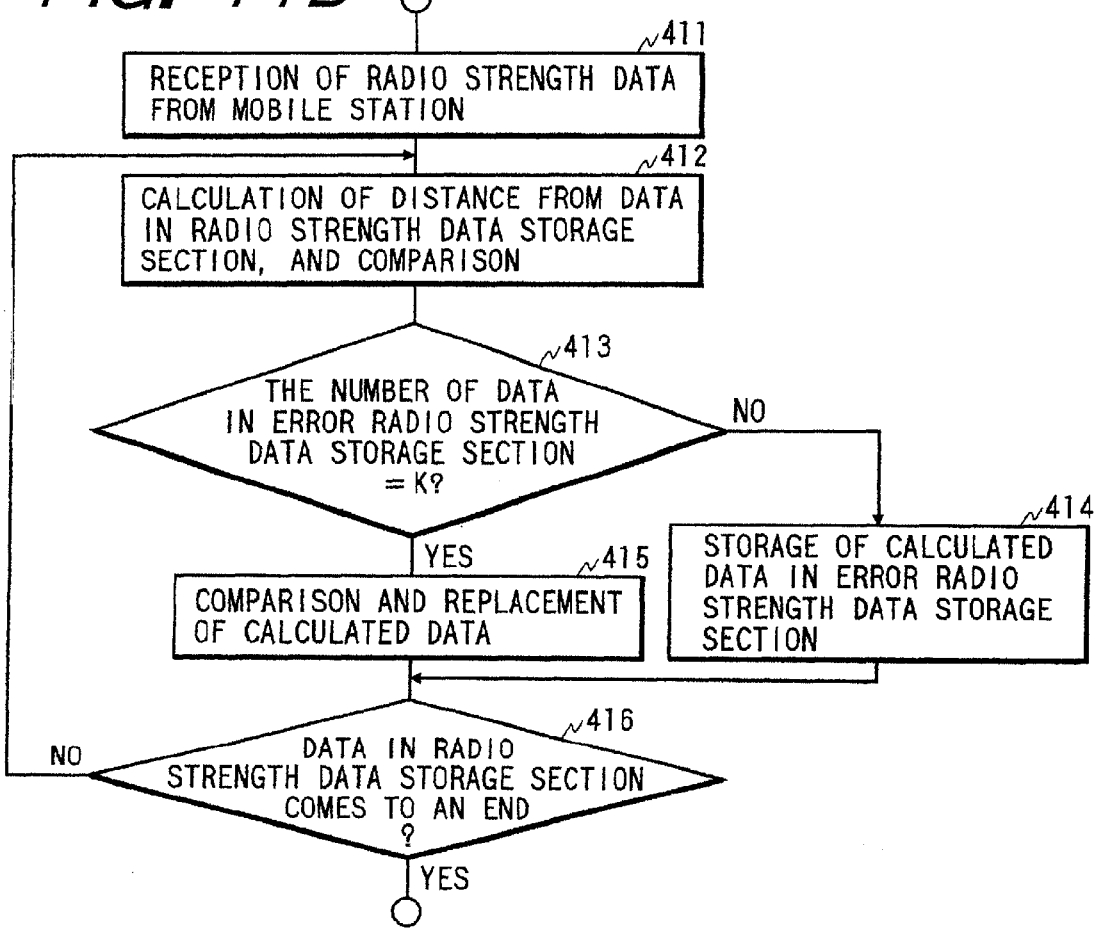
FIG. 14B is a flow chart showing a principal portion of the position detection process in the radiocommunication system adopting the position detection method according to the ninth embodiment.

Furthermore, referring to FIG. 14B, a description will be made hereinbelow of the position detection method in the step 404 conducted in the position detection unit 1165. In FIG. 12, the position detection unit 1201 corresponding to the position detection unit 1165 in FIG. 11 accepts the reception radio strength data ((B1, E1), (B2, E2), (B3, E3), (B4, E4)) based upon the radio strength levels E1, E2, E3, E4 from the base stations B1, B2, B3, B4 (step 411). The radio strength data storage section 1202 retains radio strength data comprising the positional information on a plurality of measuring points and the reception radio strength levels from a plurality of base stations at the plurality of measuring points, and the position detection section 1203 compares the reception radio strength levels with the radio strength levels from the base stations at each point retained in the radio strength data storage section 1202 (step 412). In the comparison in radio strength levels, a mathematical distance, i.e., an arbitrary distance function ρ satisfying the following conditions are used for the calculation to judge the distance on the basis of the resultant error δ. The real number ρ which is not negative singly corresponds to given binary values x and y in a set X to satisfy the following conditions.

1) ρ (x, x)=0, on the other hand, if ρ (x, y)=0, x=y
2) ρ (x, y)=p (y, x)
3) In terms of arbitrary three points x, y and z, ρ (x, z)≦ρ (x, y)+ρ (y, z).

A distance calculating method will be described hereinbelow in the case of, for example, using the Euclidean distance involving the concept of a general distance. The position detection unit 1201 receives the radio strength levels E1, E2, E3 and E4 from the four base stations B1, B2, B3 and B4 producing the higher radio strength levels. In the case that the distance between the received radio strength data ((B1, E1), (B2, E2), (B3, E3), (B4, E4)) and the jth radio strength data ((BSj1, Ej1), (BSj2, Ej2), (BSj3, Ej3), (BSj4, Ej4)) retained in the radio strength data storage section 1202 (where BSj1, BSj2, BSj3 and BSj4 respectively represent the four base stations producing the higher reception radio strength levels when received at the jth radio strength measuring point (Xi, Yi), and Ej1, Ej2, Ej3 and Ej4 respectively designate the reception radio strength levels from these base stations) is calculated using the following equation in cases where the base stations undergoing the comparison all coincide with each other, that is, B1=BSj1, B2=BSj2, B3=BSj3 and B4=BSj4.

$$\sqrt{(E_{j1} - E_1)^2 + (E_{j2} - E_2)^2 + (E_{j3} - E_3)^2 + (E_{j4} - E_2)^2}$$

Even if the base stations undergoing the comparison do not all coincide with each other, the calculation of the distance, i.e., the error, is easily possible in a manner that the radio strength levels from the base stations which are in no coincidence relation to each other are set to 0 and added.

With the decision result of the magnitude of the error thus calculated, a plurality of errors selected from the calculated errors δ in the order of increasing voltage and the position coordinates at that time are stored in the error radio strength data storage section 1204, whereas the position detection section 1203 stores the position coordinates (x, y) at that point and the calculated errors δ in the error radio strength data storage section 1204 (step 414) until the number of data retained in the error radio strength data storage section 1204 reaches k (k: an integer being 2 or more) (step 413). When the number of radio strength data retained in the error radio strength data storage section 1204 reaches k (step 413), the k errors δm (1<=m<=k) retained in the error radio strength data storage section 1204 and the position coordinates at that time are set as follows and arranged in the order of increasing error.

((xm, ym), δm) (1<=m<=k)

The position detection section 1203 compares the calculated error δ with the largest δk of the k errors δm (1<=m<=k) stored in the error radio strength data storage section 1204. If δ is smaller than δk, the radio strength data ((xk, yk), δk) having the maximum error in the error radio strength data storage section 1204 is replaced with the radio strength data based on δ and the coordinates at that time. The k radio strength data including the replaced radio strength data are compared in the magnitude of error with each other and rearranged in the order of increasing error, so that the k radio strength data are newly produced as follows (step 415).

((xm, ym), δm) (1<=m<=k)

This operation is repeated till the completion of the comparison of all the data (step 416).

After the comparison decision of all the data held in the radio strength data storage section 1202, the position detection section 1203 estimates the position on the basis of the k radio strength data stored in the error radio strength data storage section 1204. As the estimation method, for example, statistical ways are available to average the k radio strength data and to calculate the weighted mean using the values of the errors δ or the radio strength levels from the base stations.

Although the above description has been made of the method of performing the comparison and decision of all the data retained in the radio strength data storage section 1202, it is easy to consider a method of narrowing down the comparison data with the base station IDs or the like to speed up the processing.

In addition, although in the above description the number k is fixed as being a specific value (an integer being 2 or more), a description will be made hereinbelow of a method to set the maximum number of radio strength data retained in the error radio strength data storage section 1204 to m and to vary the number k in accordance with the degree of the error. In the case of k=5, let it be assumed that the error radio strength data storage section 1204 retains the following 5 sets of coordinate data and errors which are arranged in the order of increasing error.

1. ((33, 24), 2.57)
2. ((31, 22), 4.61)
3. ((34, 22), 4.78)
4. ((31, 57), 16.12)
5. ((34, 59), 18.34)

The differences between the errors of these 5 sets of radio strength data are as follows.
Error
 1–2 2.04
 2–3 0.17
 3–4 11.34
 4–5 2.22

As obvious from this, the difference between the errors of the third and fourth sets is large. In this instance, the fourth and following sets of data involve a large error and can be considered to be low in reliability. For example, let it be assumed that, when the error difference is 5 or more, the following data are not treated as the data, the number k is set to k=3 so that the estimation of the position is made on the basis of the 3 radio strength data, thus promoting the position detection accuracy.

As described above, the position detection section makes a comparison between the radio strength data in the radio strength data storage section and the reception radio strength levels for the position detection to detect the position on the basis of a plurality of radio strength data involving a small error, retained in the error radio strength data storage section, with the result that the estimated position is not limited to the actual measuring point but the position estimation is possible within a range smaller than the interval between the measuring points.

Furthermore, it is also possible that, in terms of the plurality of radio strength data in the error radio strength data storage section, the number of radio strength data is changed in accordance with the degree of the error to enhance the position detection accuracy. The accuracy of the position detection depends upon the interval between the measuring points in the preparation, and in general, increasing the number of measuring points or increasing the number of times of measurement at the same measuring point permits the improvement of the accuracy.

Various ways are available to issue the position detection request. For example, when the user wants to know his own position, the position detection request is issued from the mobile station, and when the position managing center manages the position of the user, the position managing center issues the position detection request or the wire or radio user issues the request through the network 1162. Further, although in the above description the position detection unit located in the position information center detects the position of the mobile station, it is also possible to place the position detection unit in the mobile station or in the base station or to situate it in the wire or radio user side using the network 1162. These arrangements are easily practicable as well as the arrangement in this embodiment.

Tenth Embodiment

Figure 15:
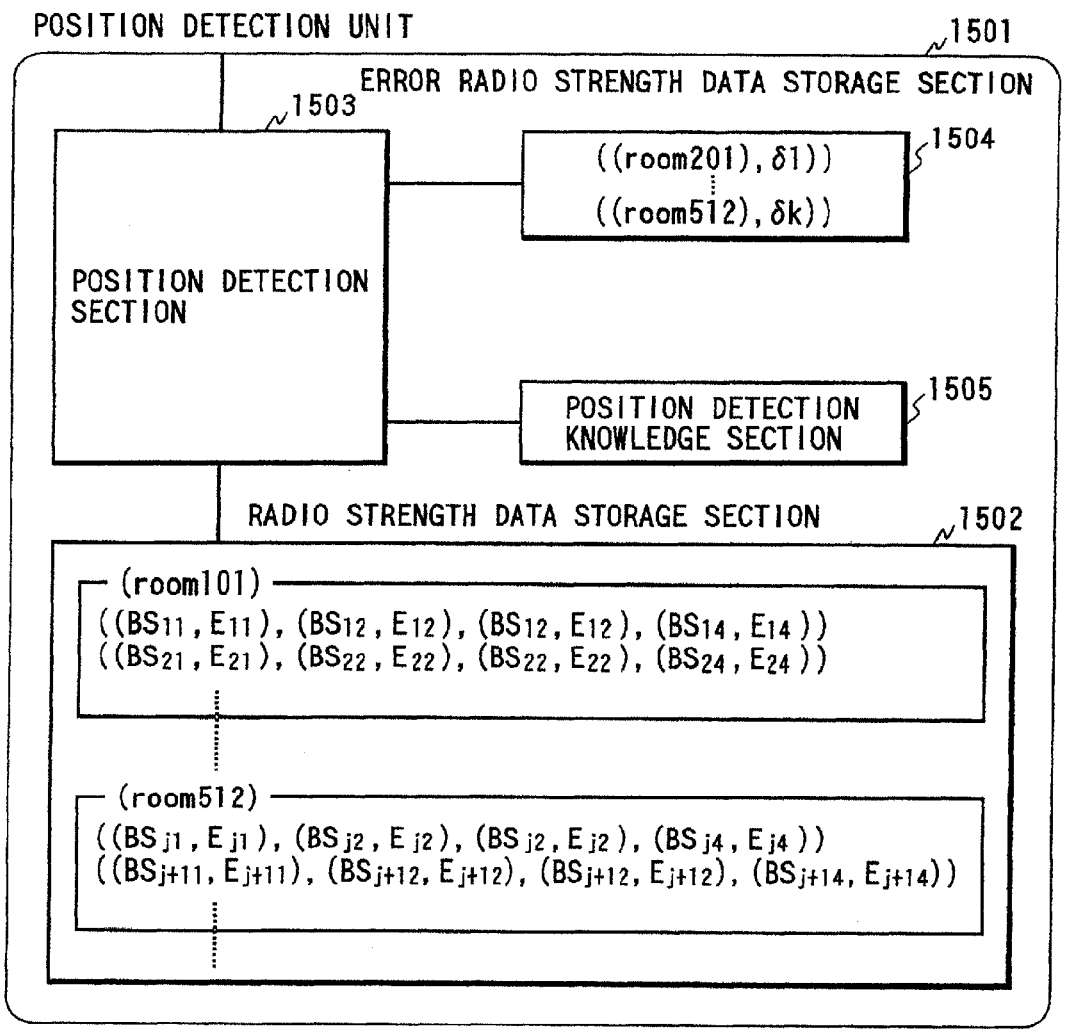
FIG. 15 is a block diagram showing an arrangement of a position detection system in a radiocommunication system based upon a position detection method according to a tenth embodiment of this invention.

Referring now to FIG. 15, a description will be made hereinbelow of an operation of a radiocommunication system based upon a position detection method of a mobile station according to a tenth embodiment of this invention. In FIG. 15, numeral 1501 signifies the position detection unit in the ninth embodiment in FIG. 11, numeral 1502 denotes a radio strength data storage section for retaining radio strength data comprising positional information on a plurality of measuring points, expressible with continuous values, and reception radio strength levels from a plurality of base stations, numeral 1503 depicts a position detection section having means to compare the radio strength data in the radio strength data storage section 1502 with the radio strength levels at a position detecting point to estimate the position of a mobile station, numeral 1504 represents an error radio strength data storage section for holding a plurality of radio strength data involving a small error, and numeral 1505 indicates a position detection knowledge section having a knowledge on a person using a radio mobile station, an action rule and a schedule of that person and others.

For the radiocommunication system adopting the position detection method according to this embodiment, a description will be taken hereinbelow of the radio strength data storage section 1502 and an example in which the positions expressible with continuous values such as coordinates temporarily stored in the error radio strength data storage section 1504 are applied to positions expressible with discrete values such as a region name, a room number and a room name. The other basic arrangements of this system are the same as those in the ninth embodiment, and the operational flow is the same as that shown in FIGS. 14A and 14B. An operation for detecting the position expressible with a discrete value will be described hereinbelow with reference to FIG. 15 in addition to the flow charts of FIGS. 14A and 14B. In this case, a room number is taken as the position expressible with the discrete value. Further, of the operation of the flow charts of FIGS. 14A and 14B, the operation up to the step 403 is the same as that in the ninth embodiment.

As in the case of the ninth embodiment, the position detection section 1503 successively compares the reception radio strength data with the radio strength data at each point, retained in the radio strength data storage section 1502, and makes a decision on the calculated errors to store the room number at that time and the calculated error δ in the error radio strength data storage section 1504. The position detection section 1503 keeps the room number at that point and the calculated error δ in the error radio strength data storage section 1504 (step 414) until the number of data in the error radio strength data storage section 1504 reaches a specific number k (k: an integer being 2 or more) (step 413). On the other hand, when the number of data in the error radio strength data storage section 1504 reaches k (step 413), the position detection section 1503 compares the calculated error δ with the k radio strength data held in the error radio strength data storage section 1504 and, if δ is smaller, replaces the radio strength data involving the maximum error in the error radio strength data storage section 15044 with the room number at that time and the error δ (step 415). This operation is repeated till the completion of the comparison of all the data (step 416).

After the comparison and decision of all the data in the radio strength data storage section 1502, the position detection section 1503 estimates the position of the mobile station on the basis of the k radio strength data retained in the error radio strength data storage section 1504. For example, as the estimation method, a method can be taken to simply make a majority decision, while it i3 possible to further estimate the degree of the reliability of the estimation result as a function of the rate of the estimated position to the k radio strength data. For example, when k=5, if all the five data in the error radio strength data storage section 1504 show one room number "room 201", the decision can be made to that the detected position must almost be "room 201". Assuming that 3 data of the 5 data signify "room 201 and 2 data thereof show "room 202", the "room 201" constitutes 60% while the "room 202" occupies 40%. Accordingly, the decision is made to that probably the mobile station exists in the "room 201", but there is a possibility that it stands in the "room 202".

Figure 16:
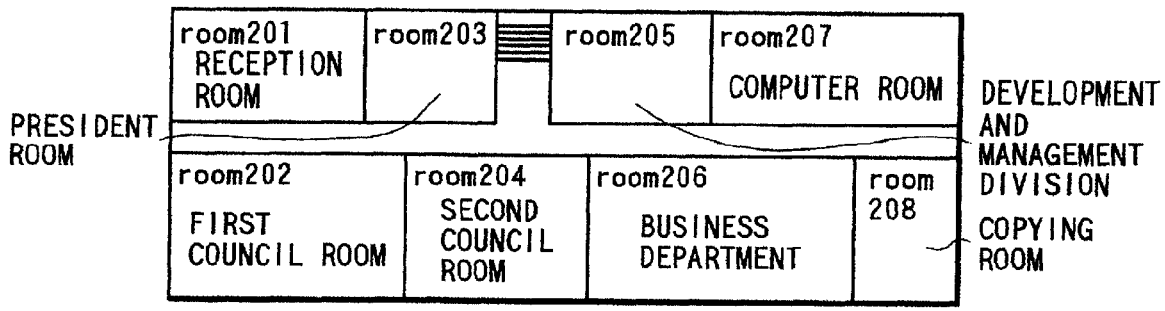
FIG. 16 shows an example of the layout of rooms in which a radiocommunication system adopting the position detection method according to the tenth embodiment accomplishes a position detection.

In addition, the detection accuracy can further improve in a manner of using, at the position estimation, the knowledge on the person carrying the mobile station and the action rule and schedule of that person retained in the position detection knowledge section 1505. FIG. 16 shows an example of the layout of rooms and the following table shows a knowledge on the connections of persons carrying mobile stations to each of the rooms shown in FIG. 16. A description will be taken hereinbelow of a method to estimate the position of the mobile station using the knowledge in the position detection knowledge section 1506 with reference to the following table.

TABLE

| Room No | Room Name | Tanaka | Suzuki | Yoshida | ... |
|---------|-----------|--------|--------|---------|-----|
| room 201 | reception room | A | A | C | |
| room 202 | first council room | B | B | B | |
| room 203 | president room | A | C | C | |

TABLE-continued

| Room No | Room Name | Tanaka | Suzuki | Yoshida | ... |
|---------|-----------|--------|--------|---------|-----|
| room 204 | second council room | B | B | B | |
| room 205 | development and management division | B | C | A | |
| room 206 | business department | B | A | B | |
| room 207 | computer room | C | C | A | |
| room 208 | copying room | A | A | A | |
| . | | | | | |
| . | | | | | |

In the table, symbols A, B and C signify the degrees of the connections to persons and the meanings of the symbols A, B and C are as follows.

A: room used frequently

B : room used sometimes

C : inhibition of entry or room seldom used

For detecting the position of one person, for example Mr Yoshida, in the case of k=5, assuming that as a result of the detection processing, of the k radio strength data in the error radio strength data storage section 1504, 3 data show "room 201" while 2 data show "room 202", judging from the knowledge table it can be considered that Mr. Yoshida seldom uses the room 201" being a reception room, and therefore it is possible to estimate that the detected position is the "room 202" being a first council room.

Figure 17:
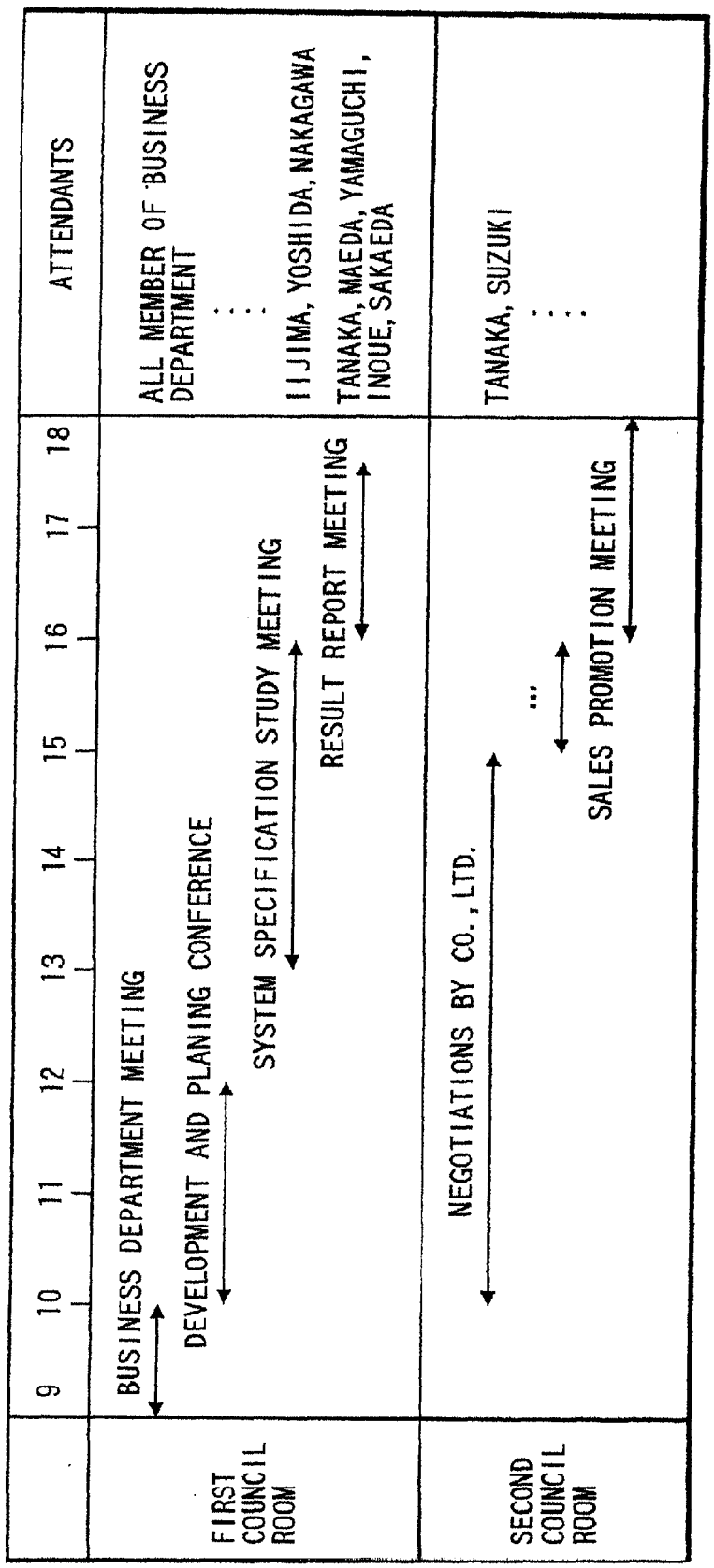
FIG. 17 illustrates an example of a meeting room reservation system connected to a radiocommunication system adopting the position detection method according to the tenth embodiment.

Furthermore, it is also possible to employ a method for estimating the position of a mobile station in cooperation with a different system such as a council room reservation system and an individual or group schedule managing system which is used as the position detection knowledge section 1506. An estimation method will be described in the case of employing, as one example, a council room reservation system shown in FIG. 17. In this case, let it be assumed that the layout of the rooms to be detected is the same as that shown in FIG. 16 and the council room reservation system has data on the reservation status of the respective council rooms as shown in FIG. 17. In the case of detecting the position of Mr. Yoshida at about two in the afternoon, let it be assumed that, when k=5, as a result of the detection, 3 radio strength data of the radio strength data in the error radio strength data storage section 1504 show "room 204" while 2 radio strength data thereof show "room 202". The position detection knowledge section 1506 connected with the council room reservation system manages the time period of the use of the council rooms under reservation and persons or groups who use the council rooms during the time period under reservation at every council room. Mr. Yoshida is scheduled to join a system specification study meeting in the first council room. From this knowledge, an estimation is made to that the position of Mr. Yoshida is within the first council room being "room 202".

Figure 18:
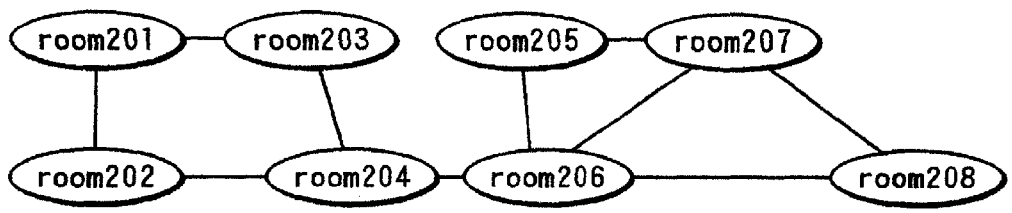
FIG. 18 is a graphic illustration of connections between rooms in a radiocommunication system adopting the position detection method according to the tenth embodiment.

Moreover, with reference to a neighboring room graph shown in FIG. 18, a description will be taken of an estimation method to estimate the position using, as the position detection knowledge section 1505, the knowledge on the relationship between a plurality of positions expressible with discrete values. In this instance, the layout of rooms to be detected is the same as that shown in FIG. 16, and FIG. 18 shows an example of a neighboring room graph based on the rooms shown in FIG. 16. In terms of the neighboring relationship, the connection between the rooms, i.e., the ease of radio wave transmission, varies due to the magnitudes of the contact area between the rooms and the wall thicknesses. Although the neighboring relationship between the rooms can involve the connection relationship in the neighboring length, the distance from the center of the room and others, for the simplicity the description will be taken of an example graphed on the assumption that the connecting relationship is present if the rooms other than corridors are in neighboring relation to each other.

In the case of detecting the position of one person, for example Mr. Yoshida, assuming that, when k=5, as a result of the detection processing, 3 data of the radio strength data in the error radio strength data storage section 1504 show "room 205", one data shows "room 206" and one data shows "room 202", from the FIG. 18 neighboring room graph it is supposed that, because the "room 202" indicated by one data in the error radio strength data storage section 1504 is not adjacent to the other "room 205" and "room 206", the data corresponding to the "room 202" is incorrect. Whereupon, it is presumed that probably Mr. Yoshida may exist in the "room 205" or may stand in the vicinity of the "room 206" adjacent to the "room 205".

As described above, at the position detection the radio strength data in the radio strength data storage section are compared with the reception radio strength levels for a position detection, and the position detection control section estimates the position using a statistical method on the basis of a plurality of radio strength data involving a comparison error which are retained in the error radio strength data storage section and estimate the degree of the reliability of the position detection result through the use of a statistical method using, for example the occupying rate of the estimated position to the plurality. In addition, if using the knowledge on a person and the action rule and schedule of that person, the data with a low entry possibility such as the inhibition of entry is removable, whereas the data with a high entry possibility can be selected, thus developing the position detection accuracy.

Furthermore, when using the knowledge on the mutual relationship between a plurality of positions expressible with discrete values, it is possible to remove the data remote in connection from a plurality of radio strength data held in the error radio strength data storage section, and it is possible to decide whether or not the position is in the vicinity of the boundary between the rooms, which can improve the position detection accuracy. The position detection accuracy depends upon the interval between the measuring point in the preparation, and in general, if increasing the number of measuring points in the preparation or increasing the number of times of measurement at the same measuring point, the accuracy heightens.

Although for the simplicity in the above description the comparison and decision are made to all the data retained in the radio strength data storage section 1202, as well as the ninth embodiment it is easily possible to employ a method to narrow down the comparison data using the base station IDs to speed up the processing.

Eleventh Embodiment

Figure 19:
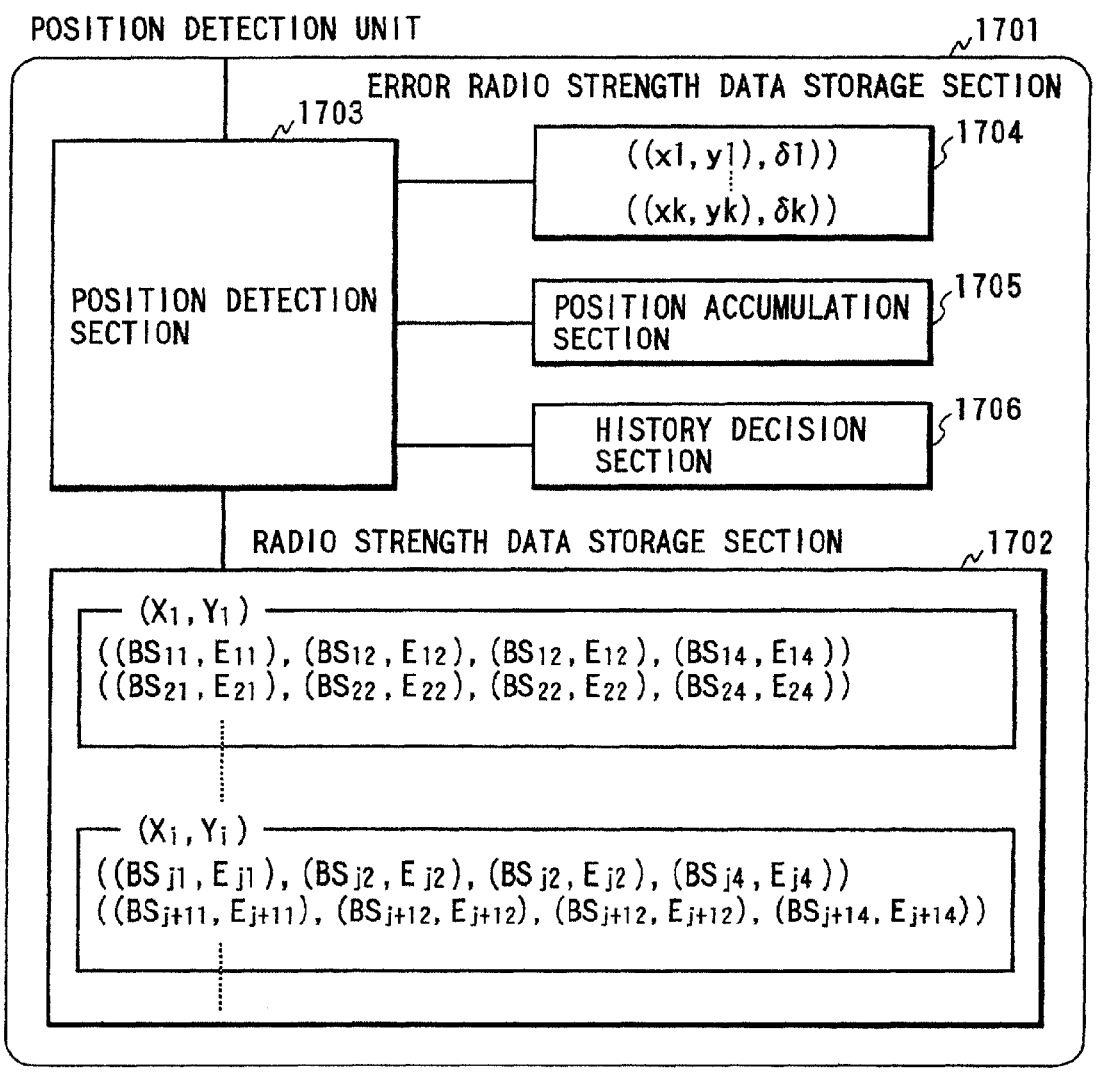
FIG. 19 is a block diagram showing an arrangement of a position detection system in a radiocommunication system based upon a position detection method according to an eleventh embodiment of this invention.
Figure 20:
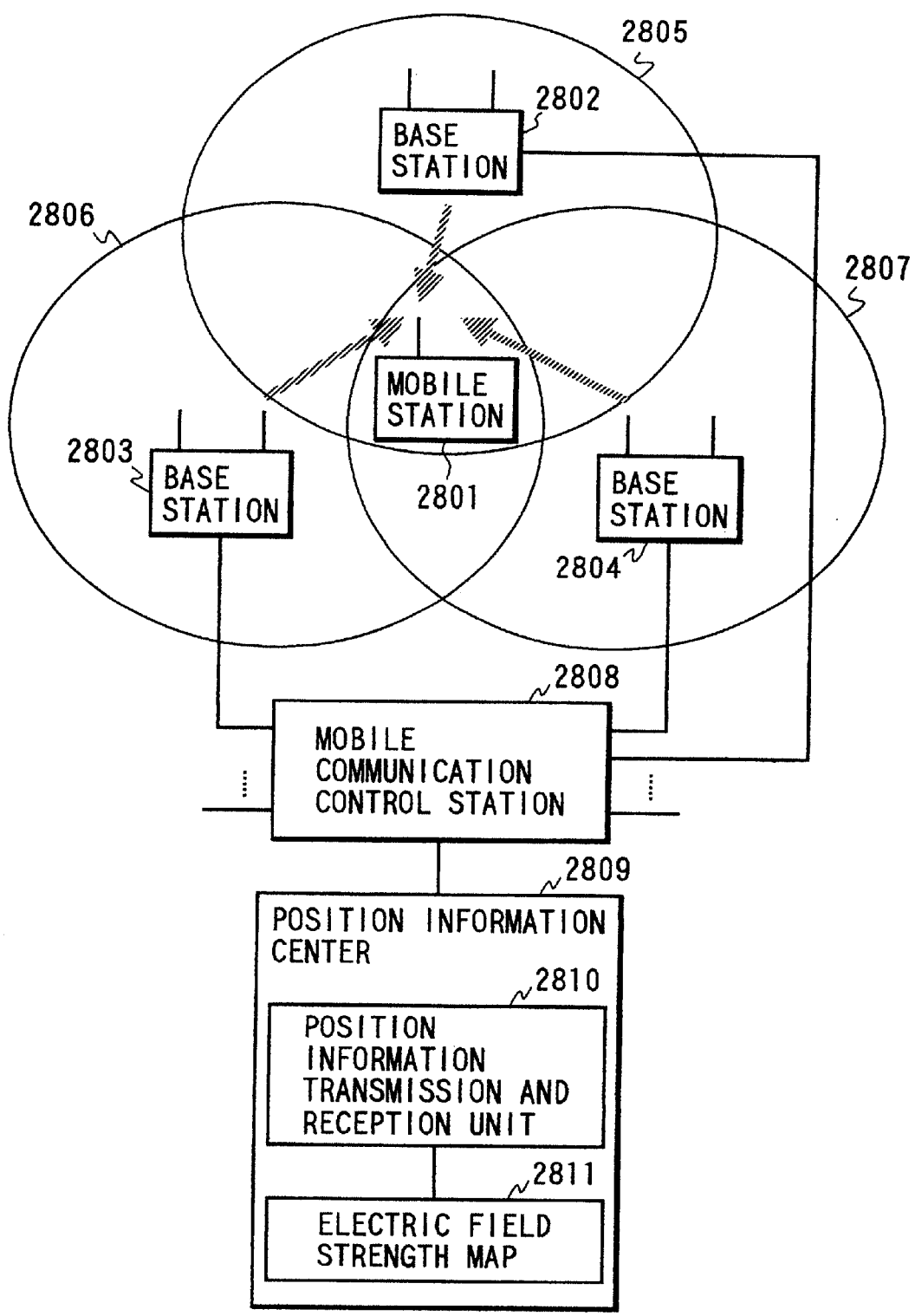
FIG. 20 shows an arrangement of a radiocommunication system which adopts a prior position detection method.
Figure 21:
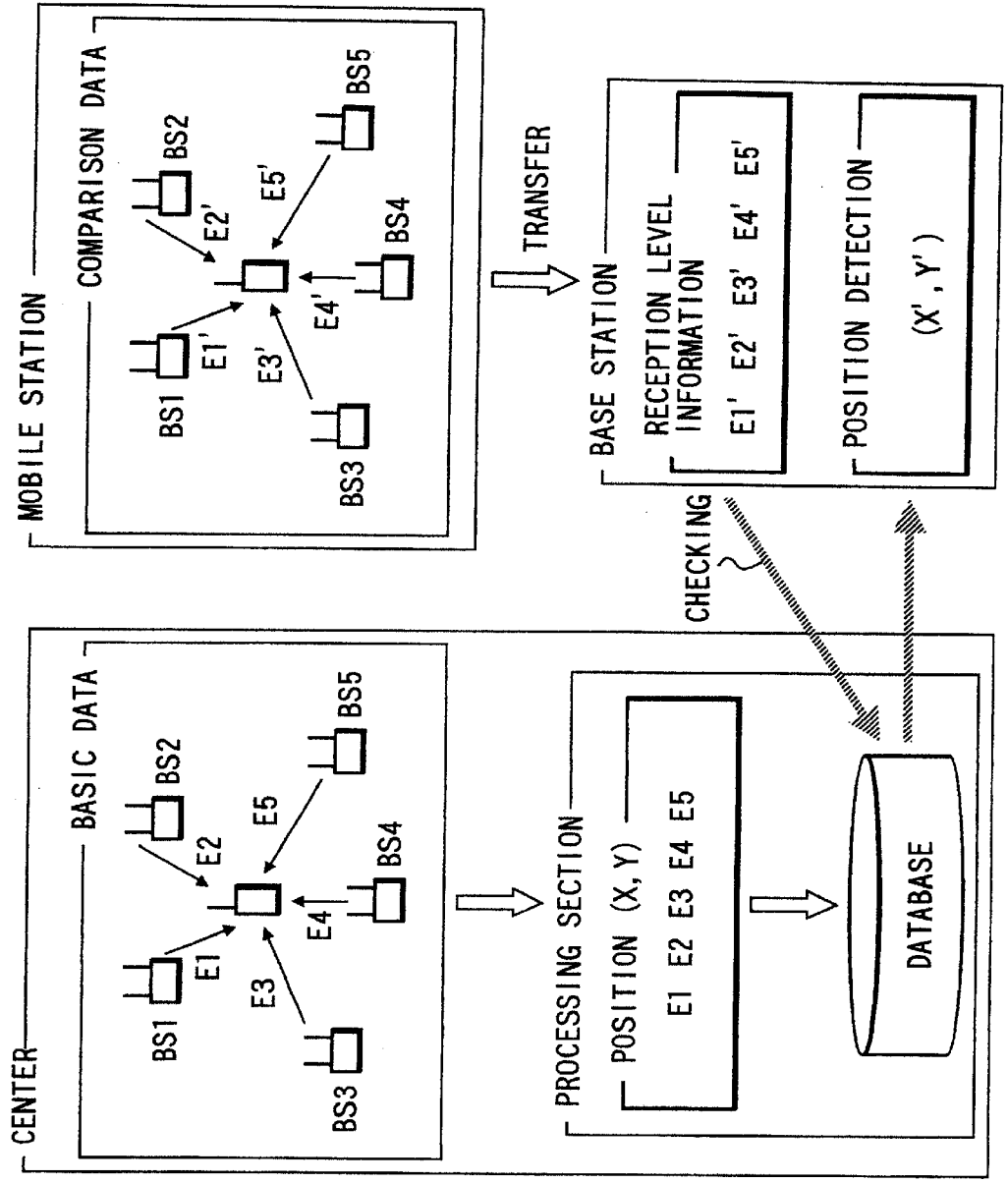
FIG. 21 shows an arrangement of a radiocommunication system based upon a prior position detection method.

Referring to FIG. 19, a description will be made hereinbelow of an operation of a radiocommunication system based upon a radio mobile station position detection method according to an eleventh embodiment of this invention. In FIG. 19, numeral 1701 stands for the position detection unit of FIG. 11 in the ninth embodiment, numeral 1702 designates a radio strength data storage section for retaining radio strength data comprising positional information of a plurality of measuring points expressible with continuous values and reception radio strength levels from a plurality of base stations, numeral 1703 represents a position detection section having means to compare the radio strength data in the radio strength data storage section 1702 with radio strength levels at a position detecting point to estimate the position of a mobile station, numeral 1704 denotes an error radio strength data storage section for retaining a plurality of radio strength data involving a small error, numeral 1705 depicts a position accumulation section for accumulating the positions estimated in the past, and numeral 1706 signifies a history decision section for deciding a position on the basis of the data in the position accumulation section 1705.

A radiocommunication system adopting a position detection method according to this embodiment is characterised by including the position accumulation section 1705 and the history decision section 1706 in the position detection unit 1201 or 1501, in addition to the arrangement of the ninth or tenth embodiment. The basic arrangement of this system is the same as that of the ninth or tenth embodiment, besides the operational flow is the same as that shown in the flow charts of FIGS. 14A and 14B.

Referring to FIG. 19, a description will be made hereinbelow of a position detecting operation in the case of the method of detecting the position coordinates in the ninth embodiment. As in the case of the ninth embodiment, the position detection section 1703 successively compares the reception radio strength data with the radio strength data at the respective points retained in the error radio strength data storage section 1702, and after the completion of the comparison and decision of all the data, the position detection section 1703 estimates the position on the basis of the k radio strength data (k: an integer being 2 or more) held in the error radio strength data storage section 1704.

In the position detection unit 1701, the position accumulation section 1705 stores, together with a time stamp, all the position coordinates of the mobile station obtained by the position detection section 1703 in the past as time series data at every mobile station. The position detection section 1703 obtains the position coordinates of the mobile station on the basis of the k coordinate data stored in the error radio strength data storage section 1704 and hands over the position coordinates to the history decision section 1706. The history detection section 1706 refers to the past position history of the mobile station accumulated in the position accumulation section 1705 to check whether the coordinates of the present position of the mobile station estimated in the position detection section 1703 are appropriate or not.

Various ways can be taken as the decision criterion. For example, the decision can be made by checking whether the moving speed calculated on the basis of the estimated position immediately before, the time of the estimation and the present position, the time is appropriate or not for the user carrying the mobile station. Or, the appropriateness is judged on the basis of the degree (an angle made by a moving vector, or the like) of the deviation from the moving direction indicated by a drawn past position history locus.

Furthermore, in the case that the method of deciding the appropriateness of the position using the past position history is applied to the detection of the position expressible with a discrete value in the tenth embodiment, the history information such as the time stamps and the room numbers accumulated in the position accumulation section 1705 can be considered to be accumulated in a state with being divided into a short-term history accumulating the position estimated immediately before and the time and a long-term history, for example a relatively long term of approximately 6 months, accumulating the past experiences such as the places to which the mobile station has moved in the past and the frequencies of the movements on the basis of the short-term histories. The short-term history can be used for the decision of the appropriateness of the position estimated from the moving speed or the locus as described above, while the long-term history can be used such that, judging from the long-term history whether or not there have been experiences of movement thereto, of the k radio strength data in the error radio strength data storage section 1704, the radio strength data indicative of the positional information with a low rate to the whole is left out of consideration as being the data with almost no possibility of movement, thus enhancing the detection accuracy.

If the decision is made to that all the k data are not appropriate, for example, the position detection section 1703 again issues the radio strength report request to resume the position detection.

Accordingly, even if a large variation of the electric field distribution of a base station occurs, the radio communication system based upon the position detection method according to this embodiment can judge the appropriateness of the estimated position by calculating the moving speed, the locus or the like on the basis of the short-term history. Further, using the long-term history, the judgment of the appropriateness of the estimated position is possible on the basis of the possibility of movement on the past experience. Nevertheless, if the reliability in the accuracy of the position detection of the mobile station obtained in the position estimation processing section is expected to be low, the position measurement in the mobile station is again done to repeatedly carry out the position estimation so that the accuracy and reliability of the position detection improve.

With the position detection method according to this invention, in the first place, in the case of detecting the position expressible with continuous values such as coordinates, the position detection section compares the radio strength data in the radio strength data storage section with the reception radio strength levels for the position detection to detect the position on the basis of a plurality of radio strength data involving a small error retained in the error radio strength data storage section, with the result that the estimated position is not limited to the actual measuring points and the estimation of the position is possible within a range smaller than the interval of the measuring points.

In the next place, a plurality of radio strength data of the reception radio strength levels from the plurality of base stations measured in the mobile station are used for the position detection, with the result that it is possible to detect the position such as a room expressible with a discrete value and further to estimate the degree of the reliability of the estimated position.

Furthermore, by using the knowledge on a person and the action rule or schedule of that person at the position estimation, it is possible to leave the data with a low possibility of movement, such as the inhibition of entry to a room, out of consideration whereas it is possible to select the data with a high possibility of movement, thus improving the position detection accuracy.

Still further, by using the knowledge -on the mutual relationship between a plurality of positions expressible with discrete values, the data remote in connection are removable from a plurality of radio strength data stored in the error radio strength data storage section, and it is possible to decide whether or not the position is in the vicinity of the boundary between rooms, which can improve the position detection accuracy. Moreover, the number of a plurality of radio strength data in the error radio strength data storage section is changed in accordance with the magnitude of the error, thereby improving the position detection accuracy. Further, the moving speed or the locus is calculated from a short-term history to decide the appropriateness of the estimated position, with the result that the improvement of the position detection accuracy is possible. Further, using a long-term history, the appropriateness of the estimated position is judged on the basis of the moving possibility on the past experience.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A system for detecting a position of a radio mobile station in a wireless radiocommunication system for radio-communications between said mobile station and a plurality of base stations, said detection system comprising:

a radio strength data storage section for retaining radio strength data including positional information of a plurality of measuring points expressible with a continuous value and reception radio strength levels from said plurality of base stations at said plurality of measuring points;

a position detection section for comparing said radio strength data in said radio strength data storage section with radio strength levels at a position detecting point; and an error radio strength data storage section for retaining a plurality of radio strength data involving small errors of errors serving as comparison references in said position detection section, and further for retaining the corresponding position information at that time, wherein said position detection section estimates and detects a position of said mobile station on the basis of said plurality of radio strength data stored in said error radio strength data storage section so that the detected position is not limited to said measuring points but is within a range smaller than an interval of said measuring points.

2. A position detection system as defined in claim 1, wherein the number of radio strength data retained in said error radio strength data storage section is changed in accordance with an error between the radio strength levels at said position detecting point and said radio strength data in said radio strength data storage section for the position detection.

3. A position detection system as defined in claim 1, further comprising a position detection knowledge section having a knowledge on a person carrying said mobile station and an action rule or a schedule of said person, said position detection section implementing the position detection on the basis of said plurality of radio strength data in said error radio strength data storage section and said knowledge in said position detection knowledge section, wherein the number of radio strength data retained in said error radio strength data storage section is changed in accordance with an error between the radio strength levels at said position detecting point and said radio strength data in said radio strength data storage section for the position detection.

4. A system for detecting a position of a radio mobile station in a wireless radiocommunication system for radiocommunications between said mobile station and a plurality of base stations, said detection system comprising:

a radio strength data storage section for retaining radio strength data including positional information of a plurality of measuring points expressible with a discrete value and reception radio strength levels from said plurality of base stations at said plurality of measuring points;

a position detection section for comparing said radio strength data in said radio strength data storage section with radio strength levels at a position detecting point; and an error radio strength data storage section for retaining a plurality of radio strength data involving small errors of errors serving as comparison criterion in said position detection section, and further for retaining the corresponding positional information at that time, wherein said position detection section estimates and detects a position of said mobile station, expressible with a discrete value, on the basis of said plurality of radio strength data stored in said error radio strength data storage section.

5. A position detection system as defined in claim 4, wherein the number of radio strength data retained in said error radio strength data storage section is changed in accordance with an error between the radio strength levels at said position detecting point and said radio strength data in said radio strength data storage section for the position detection.

6. A position detection system as defined in claim 4, further comprising a position detection knowledge section having a knowledge on a person carrying said mobile station and an action rule or a schedule of said person, said position detection section implementing the position detection on the basis of said plurality of radio strength data in said error radio strength data storage section and said knowledge in said position detection knowledge section, wherein the number of radio strength data retained in said error radio strength data storage section is changed in accordance with an error between the radio strength levels at said position detecting point and said radio strength data in said radio strength data storage section for the position detection.

7. A position detection system as defined in claim 4, wherein said position detection section is equipped with a position detection knowledge section having a knowledge on a mutual relationship between a plurality of positions expressible with discrete values, and performs the position detection on the basis of said plurality of radio strength data in said error radio strength data storage section and said knowledge in said position detection knowledge section, and wherein the number of radio strength data retained in said error radio strength data storage section is changed in accordance with an error between the radio strength levels at said position detecting point and said radio strength data in said radio strength data storage section for the position detection.

\* \* \* \* \*